United States Patent
Sarim et al.

(10) Patent No.: US 11,790,791 B2
(45) Date of Patent: Oct. 17, 2023

(54) MARKET BASED DETECT AND AVOID (DAA) SOLUTIONS

(71) Applicant: InterDigital Patent Holdings, Inc., Wilmington, DE (US)

(72) Inventors: Mohammad Sarim, Cincinnati, OH (US); Matthew Dechering, Cincinnati, OH (US); Mohammadreza Radmanesh, Cincinnati, OH (US); Manish Kumar, Cincinnati, OH (US); Ravikumar Pragada, Warrington, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 409 days.

(21) Appl. No.: 17/052,713

(22) PCT Filed: Apr. 26, 2019

(86) PCT No.: PCT/US2019/029350
§ 371 (c)(1),
(2) Date: Nov. 3, 2020

(87) PCT Pub. No.: WO2019/212892
PCT Pub. Date: Nov. 7, 2019

(65) Prior Publication Data
US 2021/0241634 A1 Aug. 5, 2021

Related U.S. Application Data

(60) Provisional application No. 62/667,061, filed on May 4, 2018.

(51) Int. Cl.
*G08G 5/00* (2006.01)
*H04L 67/125* (2022.01)

(52) U.S. Cl.
CPC ......... *G08G 5/0043* (2013.01); *G08G 5/0013* (2013.01); *G08G 5/0021* (2013.01);
(Continued)

(58) Field of Classification Search
CPC .. G08G 5/0043; G08G 5/0013; G08G 5/0021; G08G 5/0073; G08G 5/0069; H04L 67/125
See application file for complete search history.

(56) References Cited

U.S. PATENT DOCUMENTS 11,433,885 B1 * 9/2022 Beller ................ B60W 30/095
2007/0288133 A1 * 12/2007 Nishira ............ B60W 30/0956
701/23

(Continued)

FOREIGN PATENT DOCUMENTS

CN 105489069 A 4/2016
CN 105874479 A 8/2016
(Continued)

OTHER PUBLICATIONS

Ray, Ingeborgl., "ADS Integration Into The Flight Management Computer". In FAA, The First Annual International Satellite Surveillance and Communication Symposium, (1991), pp. 277-280 (4 pages).

(Continued)

*Primary Examiner* — Frederick M Brushaber
(74) *Attorney, Agent, or Firm* — Klintworth & Rozenblat IP LLC

(57) ABSTRACT

Methods and systems herein relate to unmanned aerial vehicles (UAVs) avoiding collisions by interacting with servers. Some embodiments of a method include receiving, by an unmanned aircraft system (UAS) traffic management (UTM) server one or more intended trajectories from one or more UAVs; determining, by the UTM server one or more
(Continued)

conflicts based on the intended trajectories intersecting over a region monitored by the UTM server; and communicating, by the UTM server the one or more conflicts, the communicating includes assigning a value to each of a plurality of three-dimensional (3D) grid cells representing the region monitored by the UTM server, each value representative of a potential for conflict associated with a grid cell; and transmitting, to the one or more UAVs, value data associated with the plurality of grid cells.

16 Claims, 14 Drawing Sheets

(52) U.S. Cl.
CPC ......... *G08G 5/0073* (2013.01); *H04L 67/125* (2013.01); *G08G 5/0069* (2013.01)

(56) References Cited

U.S. PATENT DOCUMENTS

| | | | | |
|---|---|---|---|---|
| 2008/0009964 | A1* | 1/2008 | Bruemmer | G06N 3/008 700/245 |
| 2008/0009965 | A1* | 1/2008 | Bruemmer | G06N 3/008 701/23 |
| 2008/0009966 | A1* | 1/2008 | Bruemmer | G05D 1/0274 700/245 |
| 2008/0009967 | A1* | 1/2008 | Bruemmer | G05D 1/0088 700/245 |
| 2008/0009968 | A1* | 1/2008 | Bruemmer | G06N 3/008 700/245 |
| 2008/0009969 | A1* | 1/2008 | Bruemmer | G06N 3/008 700/245 |
| 2008/0009970 | A1* | 1/2008 | Bruemmer | G05D 1/0088 700/245 |
| 2016/0343258 | A1 | 11/2016 | Navarro | |
| 2017/0263132 | A1 | 9/2017 | Butler | |
| 2018/0090012 | A1* | 3/2018 | Jo | G08G 5/0078 |
| 2018/0233054 | A1* | 8/2018 | Woon | G08G 5/0056 |
| 2018/0281785 | A1* | 10/2018 | Berntorp | G08G 1/167 |
| 2019/0346854 | A1* | 11/2019 | Slutsky | G01S 13/931 |
| 2019/0389459 | A1* | 12/2019 | Berntorp | B60W 30/18163 |
| 2020/0263850 | A1* | 8/2020 | Kawaguchi | F21V 9/30 |
| 2020/0365042 | A1 | 11/2020 | Mahalingam | |

FOREIGN PATENT DOCUMENTS

| | | |
|---|---|---|
| CN | 106803363 A | 6/2017 |
| CN | 106875755 A | 6/2017 |
| WO | 2016053196 A1 | 4/2016 |
| WO | 2017048363 A1 | 3/2017 |

OTHER PUBLICATIONS

Perry, Tekla S. "In Search Of The Future Of Air Traffic Control". IEEE Spectrum, vol. 34, No. 8 (1997), pp. 18-35 (18 pages).
Nordwall, Bruce D., "Road Map Leads Faa To 'Free Flight'". Aviation Weekly, Nov. 6, 1995 (1 page).
Federal Aviation Administration, 2018. FAA UAS data exchange. https://www.faa.gov/uas/programs_partnerships/uas_data_exchange/. Online; accessed Dec. 9, 2021 (3 pages).
Jang, Dae-Sung, et. al., "Concepts Of Airspace Structures And System Analysis For UAS Traffic Flows For Urban Areas". In AIAA Information Systems—AIAA Infotech@ Aerospace, (2017), pp. 1-15 (15 pages).
Balachandran, Swee, et. al., "A Path Planning Algorithm To Enable Well-Clear Low Altitude UAS Operation Beyond Visual Line Of Sight". In Twelfth USA/Europe Air Traffic Management Research and Development Seminar (ATM2017), (2017), (9 pages).
Balachandran, Swee, et. al., "Implicitly Coordinated Detect And Avoid Capability For Safe Autonomous Operation Of Small UAS". 17th AIAA Aviation Technology, Integration, and Operations Conference, (2017), (10 pages).

Asep, R., et. al., "Automatic Collision Avoidance Based On Supervised Predictive Controllers". Control Engineering Practice, vol. 4, No. 8, (1996), pp. 1169-1175 (7 pages).
Mostov, K. S., et. al. "Fuzzy Adaptive Stabilization Of Higher Order Kalman Filters In Application To Precision Kinematic GPS." In Proceedings of the 9th International Technical Meeting of the Satellite Division of The Institute of Navigation (ION GPS), (1996), pp. 1451-1456 (6 pages).
Miura, Akira, et. al., et. al., "Aircraft Collision Avoidance With Potential Gradient—Ground-Based Avoidance For Horizontal Maneuvers". Electronics and Communications in Japan (Part III: Fundamental Electronic Science), vol. 78, No. 10, (1995), pp. 104-114 (11 pages).
Velastin, Sergio A., et. al., "Line And Circle Finding By The Weighted Mahalanobis Distance Transform And Extended Kalman Filtering". In Proceedings of 1994 IEEE International Symposium on Industrial Electronics (ISIE'94), (1994), pp. 258-263 (6 pages).
Chiang, Luciano E., "3-D CNC Trajectory Interpolation Using Bresenham's Algorithm". In Proceedings of 1994 IEEE International Symposium on Industrial Electronics (ISIE'94), (1994), pp. 264-268 (5 pages).
An, P. E., et. al., "Aspects Of Neural Networks In Intelligent Collision Avoidance Systems For Prometheus". Joint Framework for Information Technology, (1993), pp. 129-135 (8 pages).
Radmanesh, Mohammadreza, et. al., "Flight Formation Of UAVs In Presence Of Moving Obstacles Using Fast-Dynamic Mixed Integer Linear Programming". Aerospace Science and Technology, vol. 50, (2016), (20 pages).
3GPP TS 36.300 "Evolved Universal Terrestrial Radio Access (E-UTRA) and Evolved Universal Terrestrial Radio Access Network (E-UTRAN); Overall description; Stage 2", Apr. 2017 (346 pages).
Invitation to Pay Additional fees, and Where applicable Protest Fee, for PCT/US2019/029350, dated Sep. 27, 2019, 16 pages.
Koeners, Joris, et. al., "Conflict Resolution Support for Air Traffic Control Based on Solution Spaces: Design and Implementation". IEEE/AIAA 27th Digital Avionics System Conference, (2008), pp. 3.C.5-1-3. C.5-9.
Fu, Yu, et. al., "An Advanced Sense and Collision Avoidance Strategy for Unmanned Aerial Vehicles in Landing Phase". IEEE Aerospace and Electronic Systems Magazine, vol. 31, No. 9, Sep. 2016, pp. 40-52.
Albaker, B. M., et. al., "Intelligent Conflict Detection and Awareness for UAVs". Innovative Technologies in Intelligent Systems and Industrial Applications, (2009), pp. 261-264.
Lai, Chi-Kin, et. al., "On-Board Trajectory Generation for Collision Avoidance in Unmanned Aerial Vehicles". IEEE Aerospace Conference, (2011), pp. 1-14.
International Search Report and Written Opinion of the International Searching Authority for PCT/US19/29350 dated Nov. 20, 2019, 20 pages.
International Preliminary Report on Patentability for PCT/US2019/029350, dated Nov. 10, 2020, 13 pages.
Schaufele Jr., Rodger D., et. al. "FAA Aerospace Forecast: Fiscal years 2017-2037". Federal Aviation Administration, (2017), 89 pages.
Radmanesh, Mohammadreza, et. al., "A Novel Strategy for Designing and Manufacturing a Fixed Wing MAV for the Purpose of Increasing Maneuverability and Stability in Longitudinal Axis". Journal of Applied Fluid Mechanics, vol. 7, No. 3, (2014), pp. 435-446.
Nex, Francesco, et. al., "UAV for 3D Mapping Applications: A Review". Applied Geomatics, vol. 6, No. 1, (2014), pp. 1-15.
Nemati, Alireza, et. al., "Control of Microcoaxial Helicopter Based On A Reduced-Order Observer". Journal of Aerospace Engineering, vol. 29, No. 3, (2016), pp. 04015074-1-8.
Nemati, A.R., et. al., "Helicopter Adaptive Control With Parameter Estimation Based On Feedback Linearization". World Academy of Science, Engineering and Technology, International Journal of Mechanical, Aerospace, Industrial, Mechatronic and Manufacturing Engineering, vol. 1, No. 5, (2007), pp. 268-273.
Sarim, Mohammad, et. al., "Extended Kalman Filter Based Quadrotor State Estimation Based On Asynchronous Multisensor Data".

(56) References Cited

OTHER PUBLICATIONS

Proceedings of the ASME 2015 Dynamic Systems and Control Conference, DSCC2015-9929, Oct. 28-30, 2015, pp. 1-9.
Aweiss, Arwa S. et. al., "Unmanned Aircraft Systems (UAS) Traffic Management (UTM) National Campaign II". American Institute of Aeronautics and Astronautics, (2018), pp. 1-16.
Vasirani, Matteo, et. al., "A Market-Inspired Approach for Intersection Management in Urban Road Traffic Networks" Journal of Artificial Intelligence Research, vol. 43, (2012), pp. 621-659.
Reichardt, D., et. al., "Collision Avoidance In Dynamic Environments Applied To Autonomous Vehicle Guidance On The Motorway". Proceedings of Intelligent Vehicles 1994 Symposium, (1994), pp. 74-78.
Tomlin, Claire J., et. al., "A Game Theoretic Approach To Controller Design For Hybrid Systems". Proceedings of the IEEE, vol. 88, No. 7, (2000), pp. 949-970.

\* cited by examiner

MARKET BASED DETECT AND AVOID (DAA) SOLUTIONS

CROSS-REFERENCE TO RELATED APPLICATIONS

The present application is a national stage application under 35 U.S.C. 371 of International Application No. PCT/US2019/029350, entitled "MARKET BASED DETECT AND AVOID (DAA) SOLUTIONS", filed on Apr. 26, 2019, which claims benefit under 35 U.S.C. § 119(e) from U.S. Provisional Patent Application Ser. No. 62/667,061, entitled "Market Based Detect and Avoid (DAA) Solutions," filed May 4, 2018, all of which are hereby incorporated by reference in their entirety.

BACKGROUND

The military traditionally uses unmanned aerial vehicles (UAVs) for military operations. UAVs generated civilian interest for applications such as emergency management, law enforcement, precision agriculture, package delivery, infrastructure inspection, and imaging/surveillance. As the use of UAVs rapidly becomes a reality in civilian domains, it becomes increasingly critical to solve the challenges emanating from integration of UAVs in the National Airspace System (NAS). The dramatic increase in the number of aircraft, manned and unmanned, will pose severe challenges to the current Air Traffic Control (ATC). Therefore, a need exists for detect and avoid (DAA) methods for UAVs.

SUMMARY

Some embodiments of a method may include receiving, by an unmanned aircraft system (UAS) traffic management (UTM) server one or more intended trajectories from one or more unmanned aerial vehicles (UAVs); determining, by the UTM server one or more conflicts based on the intended trajectories intersecting over a region monitored by the UTM server; and communicating, by the UTM server the one or more conflicts, the communicating can include assigning a value to each of a plurality of three-dimensional (3D) grid cells representing the region monitored by the UTM server, each value representative of a potential for conflict associated with a grid cell; and transmitting, to the one or more UAVs, value data associated with the plurality of grid cells.

In some embodiments, the method also includes iteratively receiving by the UTM server one or more updates to the one or more intended trajectories from the UAVs, the one or more updates determined by optimizing the one or more intended trajectories by minimizing a summation representing locations, time and value representative of potential for conflict of each of the intended trajectories; and iteratively communicating, by the UTM server to the one or more UAVs, updated value data associated with the plurality of grid cells.

In some embodiments, the iteratively communicating updated value data includes communicating to the one or more UAVs grid cells with the potential for conflict.

In some embodiments, the updated value data is based on a determination including $(p_i)_{k,t}=(p_i)_{k-1,t}+\alpha(\Sigma_{j=1}^{n_a}x_{ij,t}-N_{i,t})$ wherein $x_{ij,t}$ is the binary variable that represents the occupancy of grid cell i by the UAV j, and N represents a maximum number of UAVs permitted a cell in the plurality of grid cells $x_{ij}$ and $(p_{ij})_k$ represents value of the cell.

In some embodiments, the plurality of 3D grid cells is a tessellated area including at least a conflict zone determined based on a safe operating distance between the one or more UAVs. In some embodiments, each UAV operates as a client with the UTM server, each UAV separately determining an updated trajectory using the value data received by the UTM server.

In some embodiments, each UAV determines the optimization by determining a minimization of $\Sigma_{i=1}^{n_r}a_{ij}x_{ij,t}-\Sigma_{i=1}^{n_r}(p_{ij})_{k,t}x_{ij,t}$ wherein $p_{ij}$ represents value data, $a_{ij}$ represents a known profit of UAV j in utilizing the grid cell i along its trajectory, $x_{ij,t}$ is the binary variable that represents the occupancy of grid cell i by the UAV j, and t represents a time.

In some embodiments, the UTM server is an edge-UTM server operating over a mobile edge computing (MEC) environment.

In some embodiments, a time period over which a grid cell of the plurality of 3D grid cells has a value that does not change identifies a stabilization of the grid cell.

Some embodiments are directed to a method including transmitting, by an unmanned aerial vehicle (UAV) running a client of an unmanned aircraft system (UAS) traffic management (UTM), a flight plan over a region monitored by a UTM server; receiving at the UAV a set of values, each value representative of a conflict likelihood associated with a grid cell of a plurality of three-dimensional (3D) grid cells of the region monitored by the UTM server; as a function of the set of values, updating the flight plan to minimize the set of values by reducing the conflict likelihood associated with the plurality of 3D grid cells; transmitting by the UAV the updated flight plan to the UTM server; receiving, at the UAV, an updated set of values; and determining a final flight plan based on the updated set of values if the updated set of values are unchanged or zero.

Other embodiments of a method include receiving, by an unmanned aerial vehicle (UAV), an environment configuration from a traffic management system server, the environment configuration including at least a size of a tessellated grid of cells representative of a conflict zone, a resolution of the grid of cells and a suitable time horizon parameter representative of a required time for conflict detection; transmitting, by the UAV, one or more of a position and a set of one or more grid cell identifiers representing waypoints; receiving, by the UAV, for a given time period, a set of values associated with identified cells of the grid of cells, the set of values identifying a likelihood of conflict for one or more of the identified cells; and determining, by the UAV, an updated set of the one or more grid cell identifiers if the set of values identifying the likelihood of conflict is non-zero.

In some embodiments, the method includes iteratively determining, by the UAV, updated sets of the one or more grid cell identifiers until the received sets of values associated with identified cells stabilizes. In some embodiments, the determining, by the UAV, the updated set of the one or more grid cell identifiers if the set of values identifying the likelihood of conflict is non-zero includes performing an optimization of the set of values by determining a minimization of $\Sigma_{i=1}^{n_r}a_{ij}x_{ij,t}-\Sigma_{i=1}^{n_r}(p_{ij})_{k,t}x_{ij,t}$, wherein $p_{ij}$ represents value data, and $a_{ij}$ represents a known profit of UAV j in utilizing the grid cell i along its trajectory, $x_{ij,t}$ is the binary variable that represents the occupancy of grid cell i by the UAV j, and t represents a time.

In some embodiments, the receiving, by the UAV, for the given time period, the set of values associated with identified cells of the grid of cells, the set of values identifying the likelihood of conflict for the identified cells includes receiving, by the UAV the set of values determined by the traffic management server in proximity of the UAV, wherein the traffic management server calculates each value as $(p_i)_{k,t} = (p_i)_{k-1,t} + \alpha(\Sigma_{j=1}^{n_a} x_{ij,t} - N_{i,t})$ wherein $x_{ij,t}$ is the binary variable that represents the occupancy of grid cell i by the UAV j, and t represents a time, and N represents a maximum number of UAVs permitted a cell in the plurality of grid cells $x_{ij}$ and $(p_{ij})_k$ represents value of the cell.

In some embodiments, the traffic management server is an unmanned aircraft system (UAS) traffic management (UTM) edge server (Edge-UTM server).

In some embodiments the conflict zone is a region under the Edge-UTM server's jurisdiction, the conflict zone including one or more of obstacles and no-fly zones. In some embodiments, the Edge-UTM server maintains information about each UAV flying in the conflict zone.

In some embodiments, the method also includes transmitting, by the UAV, a position, velocity and intent broadcasting signal (PIBS) message.

In some embodiments, the PIBS message is transmitted by the UAV to an access network node and forwarded to the traffic management server.

In some embodiments, a method includes detecting by an unmanned aerial vehicle (UAV), a conflict in a cell of a tessellated grid of cells representative of a conflict zone, the conflict predictive of a collision in the cell along a planned flight path; and determining, by the UAV, a bid for a revised flight path based on a profit calculation wherein profit includes path length, availability of one or more cells in the conflict zone, and energy requirements; and transmitting the revised path.

In some embodiments, the determining, by the UAV, a bid for a revised path based on a profit calculation, further includes applying a conflict zone rule by the UAV for choosing a path through the conflict zone that maximizes the profit for each UAV in the conflict zone, determining a bid based on the rule, and transmitting the bid via an update sent to an unmanned aircraft system (UAS) traffic management (UTM) server until the UAV can no longer identify a path that provides a positive profit.

In some embodiments, the determining the bid based on the rule includes determining a profit margin, the profit margin being zero or negative precluding the UAV from increasing the bid.

In some embodiments, the determining, by the UAV, a bid for a revised flight path based on a profit calculation further includes determining the profit calculation via one or more of on-board sensor data, position, velocity and intent broadcasting signal (PIBS) messages, and ground sensors.

In some embodiments, the method for the UAV includes receiving from an unmanned aircraft system (UAS) traffic management (UTM) server a confirmed flight path based on a plurality of received bids from each UAV in the conflict zone, the confirmed flight path being the result of an auction based on the plurality of received bids, each bid including a determination of the profit calculation minus a cost associated therewith.

In some embodiments, the cost associated with each bid includes at least one or more of increased path length, reduced resource availability, and increased energy requirements.

In some embodiments, the conflict zone is a region under UTM server's jurisdiction, the conflict zone including one or more of obstacles and no-fly zones.

Some embodiments include a processor and a non-transitory computer-readable storage medium storing instructions operative when executed on the processor to perform the methods herein described.

DETAILED DESCRIPTION

As the use of unmanned aerial vehicles (UAVs) rapidly become a reality in civilian domains, it becomes increasingly critical to solve the challenges emanating from integration of UAVs in the National Airspace System (NAS). A UAV should plan its mission path, re-plan or adjust its trajectory to maintain separation with other aircraft. A UAV should act in a way that does not interfere with traffic. Air Traffic Control (ATC) faces certain challenges due to the increasing use of UAVs. Hence, the Radio Technical Commission for Aviation (RTCA) and Federal Aviation Administration (FAA) have the responsibility to implement a seamless change from ATC to Air Traffic Management by 2020. To this end, the FAA deployed the Low Altitude Authorization and Notification Capability (LAANC), which enables drone pilots access to controlled airspace near airports through a UAV Service Supplier (USS). The Unmanned Aircraft Systems Traffic Management (UTM) architecture was developed by the National Aeronautics and Space Administration (NASA) and industry to foster safe and efficient integration of UAVs with national airspace systems. NASA's Technology Capability Levels (TCL) 3 tests, which occurred in Spring 2018, focused on testing technologies that maintain safe spacing between cooperative and non-cooperative UAVs over moderately populated areas. A current UTM Architecture includes an Air Navigation Service Provider (ANSP) which interfaces with NASA data sources and provides Constraints and Directives to multiple industry USSs, which coordinate with UAV Operators, each other, and supplemental service providers to maintain a clear airspace. For managing airspace traffic, there are various studies on lane-based systems, using rapidly-exploring random trees and conflict bands, implicit coordinated detect and avoid using airspace tessellation, A*, and keep-out geofences.

Although the UTM may prevent some conflicts from occurring, there is a need for Detect and Avoid (DAA) methods for UAVs. UAV traffic is subject to change due to any number of factors, including but not limited to: wind, new aircraft entering airspace, and changes in mission objectives. Therefore, methods and systems provided herein include embodiments for detect and avoid that respond appropriately and embodiments of DAA systems that maintain safety, determine how close each UAV's trajectory is to optimal for its mission, and quickly resolves conflicts.

Figure 1:
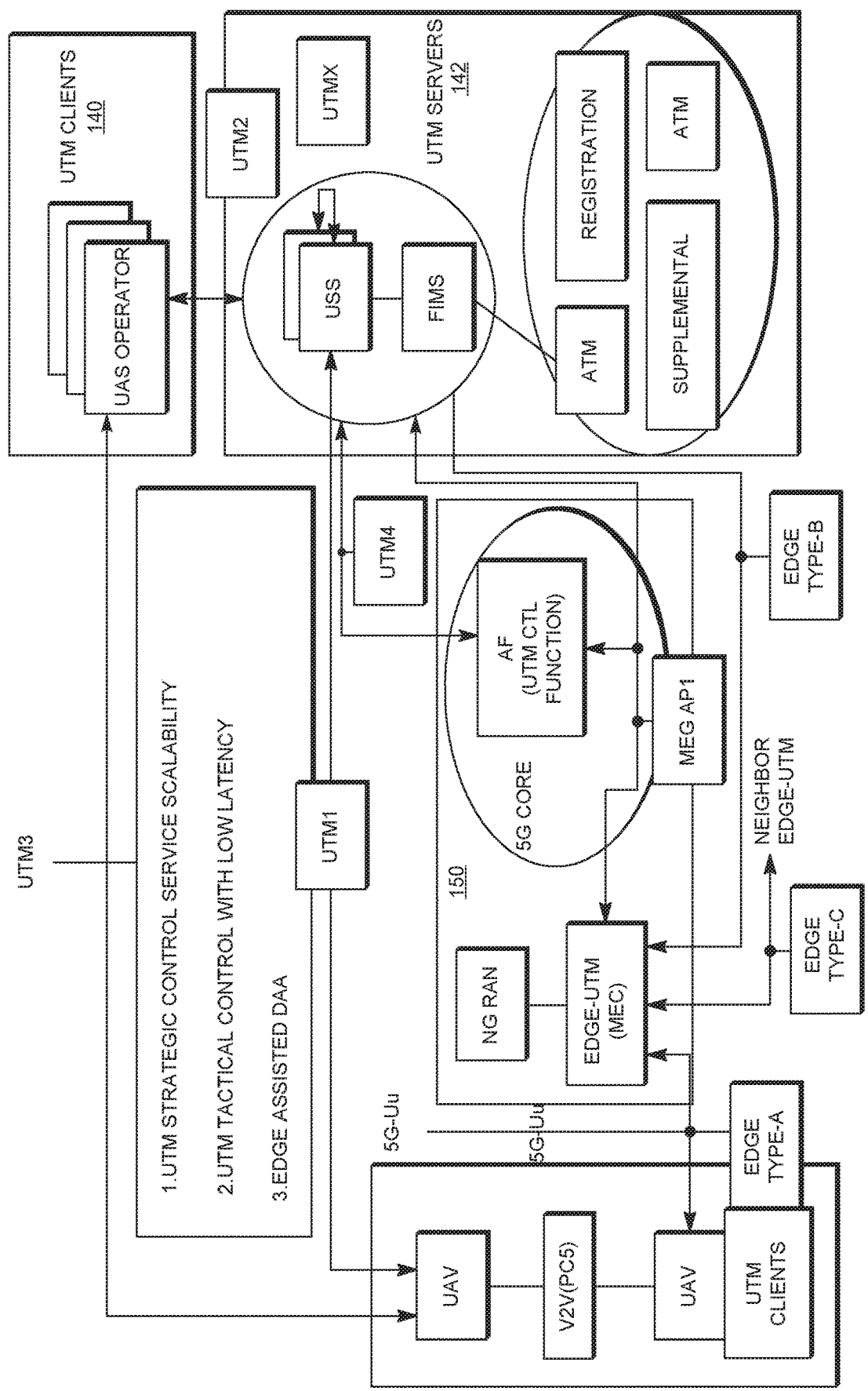
FIG. 1 is a system diagram illustrating a UTM system architecture according to an embodiment.
Figure 10:
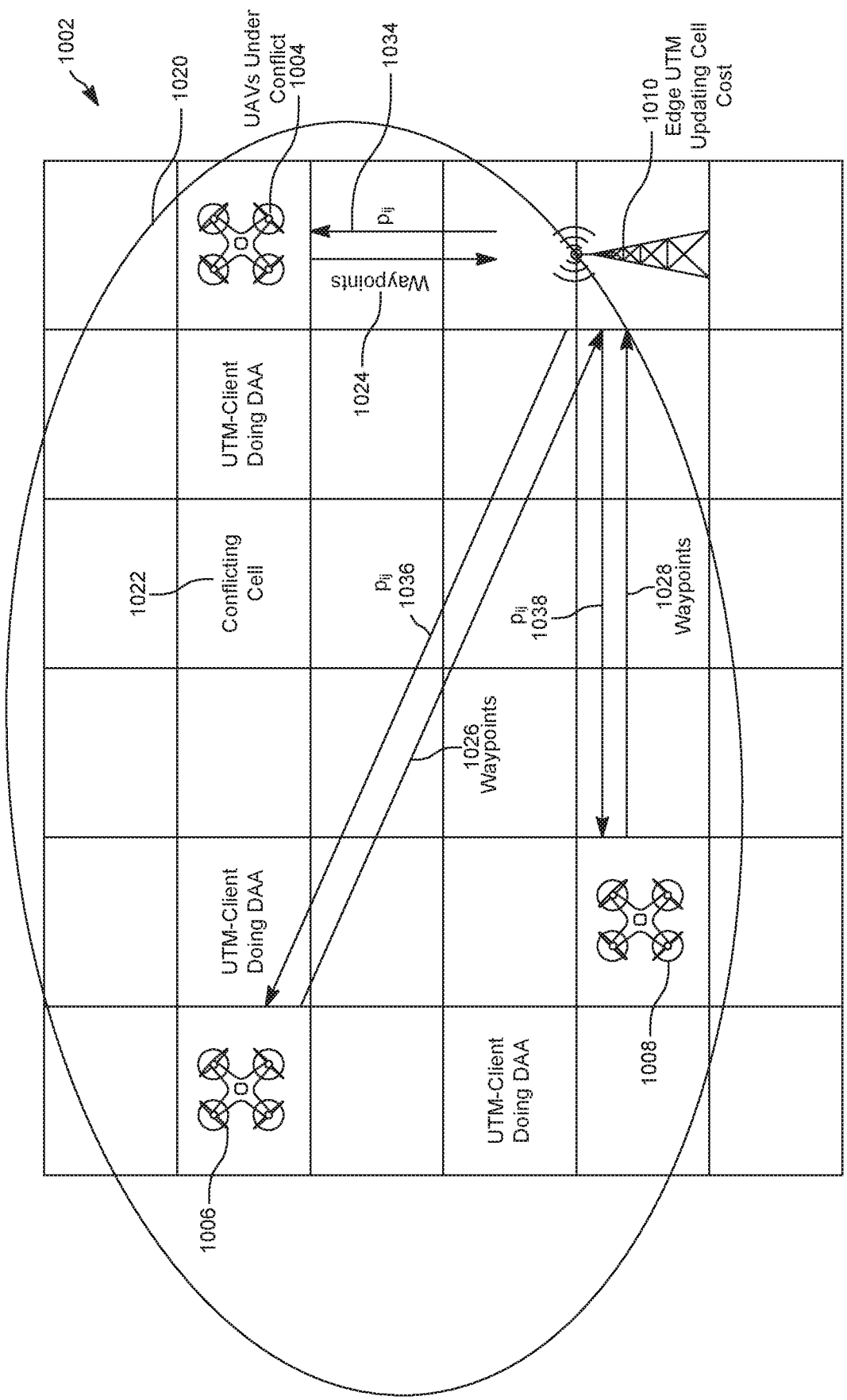
FIG. 10 is schematic diagram of a DAA solution in accordance with an embodiment.

Referring now to FIG. 1, a system architecture for a UTM is illustrated in accordance with an embodiment showing several edge UTMs. An edge-UTM as illustrated, can be deployed between cloud UTM/USS servers and the UAV clients. FIG. 10 illustrates UTM clients 140 and UTM servers 142. The closest place to the UTM clients 140 can be mobile operator network, such as network 150 that connects the UAVs. The edge-UTM functions may be deployed on the mobile edge computing (MEC) resources offered by the mobile operator network, as shown.

FIG. 1 shows an edge-UTM function is deployed in the MEC platform of mobile operator network. The mobile operator network has a UTM control function to manage the authorization of a UTM system application to access the MEC platform, such as a USS application server. Then the application may be able to request the MEC platform to deploy and instantiate edge application instance via the MEC's operation support system (OSS).

The UTM system shown in FIG. 1 may deploy an edge-UTM application in accordance with embodiments disclosed herein that improve DAA protocol performed between UAVs. Embodiments provided herein include a detect and avoid function at edge (edge-DAA) to provide a locally centralized DAA solution, which can be conflict free between multiple risks in an area.

As shown in FIG. 1, UTM clients 140 are shown that interact with a direct communications interface (PC5) that connects vehicles to vehicles (V2V) between the UTM clients 140. Each UAV is connected to a Next Generation (NG) radio access network (RAN) via a 5G radio interface (5G Uu). The NG RAN is part of mobile network 150 including an Edge-UTM (MEC), and a 5G core with an AF (UTM control function) coupled to both a UTM4 interface to UTM servers 142, and to MEC application programming interface (MEC API), which enables interfacing to an Edge-UTM MEC.

A UAV is shown coupled to an Edge-UTM mobile edge computing (MEC) resource within the mobile network 150 over an edge type-A interface. The Edge-UTM MEC is also coupled to the NG RAN and to an Edge Type-C interface that connects the Edge UTM MEC to a neighbor edge UTM and to an Edge Type-B interface. The Edge Type B interface enables a connection to UTM servers including a Flight Information Management System (FIMS) and Unmanned Aircraft Systems Service Suppliers (USS) servers which interact over a UTMX interface, and asynchronous transfer mode (ATM) type servers, registration servers and supplemental servers. UTM clients are shown coupled via a UTM2 interface to the UTM servers. UTM clients can include multiple Unmanned Aircraft Systems (UAS) Operators that are coupled to UTM client UAVs over a UTM3 interface. USS servers are also coupled to the UTM client UAVs over a UTM1 interface. As shown, the interface UTM3 and UTM1 which interfaces the UAS operators, the USS and the UAVs enables strategic controls service scalability, tactical control with low latency and edge assisted detect and avoid functionalities according to some embodiments.

Figure 2:
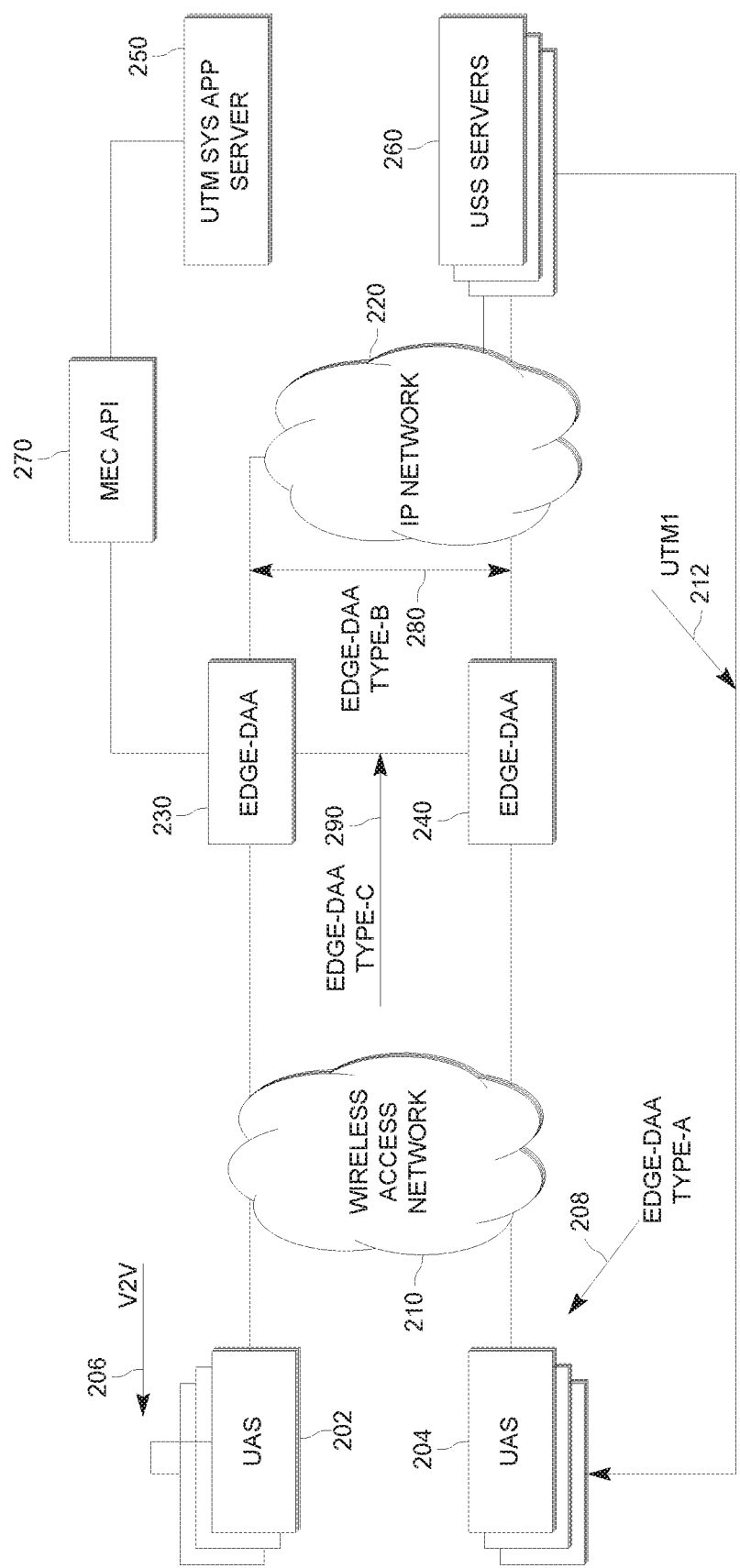
FIG. 2 is a diagram illustrating a local application deployment according to an embodiment.

Referring now to FIG. 2 diagram illustrates a local application deployment in accordance with some embodiments. As shown, UAS 202 represents multiple UAS operators that interact with V2V protocol. UAS 202 and 204 are shown coupled to wireless access network 210. And UAS 204 is shown coupled via an Edge-DAA type=A interface 208 to Wireless Access Network 210. UAS 204 is shown coupled to USS servers 260 over a UTM1 202 interface. Wireless Access Network 201 is shown coupled d to Edge-DAAs 230 and 240 which interact with each other over an Edge-DAA Type-C interface. Both Edge-DAA 230 and 240 are shown coupled over an Edge-DAA Type-B interface to IP network 220, which is also coupled to USS Servers 260. Edge-DAA 230 is also shown couple over an MEC API 270 to a UTM System Application Server 250.

As shown in FIG. 2, the Edge-DAA 230, as a UTM system application, can be deployed over the standard MEC API interface 270 of an MEC platform. Each UAV can run the UTM protocol over the UTM1 212 interface to USS servers 260 and each UAV can use the DAA protocol over the edge-DAA Type-A 208 interface to the edge-DAAs 230 and 240. In some embodiments, the edge-DAA Type-A interface 208 uses the same V2V 206 broadcasting channel used by a distributed cooperative DAA. A message from the edge-DAA 230 or 240 may be received by all UAVs via UAS 202 or 204 under the edge's coverage and vice versa. The edge-DAA 230 and 240, in some embodiments, may subscribe to the UTM/USS servers 260 over an edge-DAA Type-B interface 280 to get strategic plan and real-time status of UAS operations. The edge-DAA exchange data over an edge-DAA Type-C interface 290 between neighboring edge-DAA instances 230 and 240 may support UAVs mobility across edge coverage areas.

Figure 3:
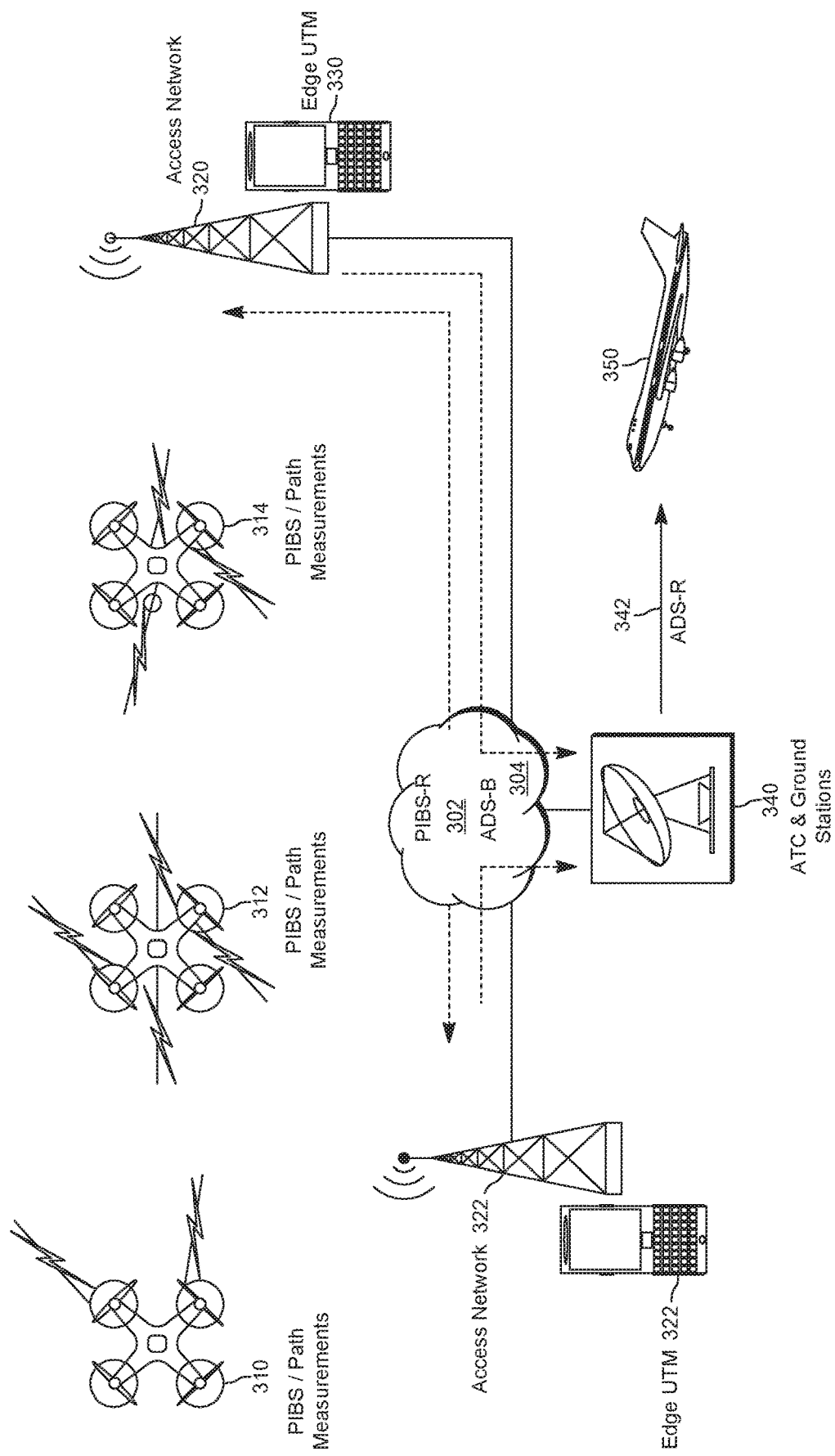
FIG. 3 is a diagram illustrating position and intent broadcasting according to an embodiment.

Referring now to FIG. 3, in some embodiments, position, velocity and intent broadcasting signal (PIBS) message system can be part of a wireless network. As shown, PIBS-R is similar to an ADS-R message 304, which is used by aircraft. More specifically, as shown in FIG. 3, a PIBS message for UAV to report its current status at adaptive transmission powers can be similar to manned aircrafts 350 using ADS-B 304, 342. PIBS can be used for surrounding UAVs to track a trajectory.

The PIBS messages 310, 312 and 314 from a UAV may also be received via an access network node 320, 322 in the broadcasting range and forwarded to an edge-UTM function 330, 332 deployed at MEC platform of the mobile operator network. The Edge-UTM function 330, 332 can also rebroadcast their received PIBS as PIBS-R 302 (PIBS rebroadcast) so that Edge-UTM 330, 332 functions at other nodes have a view of a bigger airspace than its own coverage. In addition, the edge-UTM 330, 332 functions may also include reformatting PIBS messages and transmitting them as ADS-B 304 directly to ATCs 340. ADS-B ground stations 340 may regenerate and transmit ADS-R 342 to other manned ground stations that require such information.

In some embodiments, PIBS is transmitted from a UAV directly to another UAV in broadcast mode. In some radio access technologies, direct device to device communications exist and one such example is the "Vehicle to Vehicle (V2V)" standard in LTE. UAV may utilize the V2V or a modified version of V2V feature for direct communication as proposed by a NASA research team. Like ADS-B that is broadcast on two dedicated frequencies, in some embodiments, PIBS is broadcast on a frequency dedicated by FAA. In other embodiments, PIBS may be transmitted on a cellular operators licensed spectrum. In some embodiments, the dedicated short-range communications (DSRC) spectrum for connected vehicles is used for PIBS communications.

Figure 4:
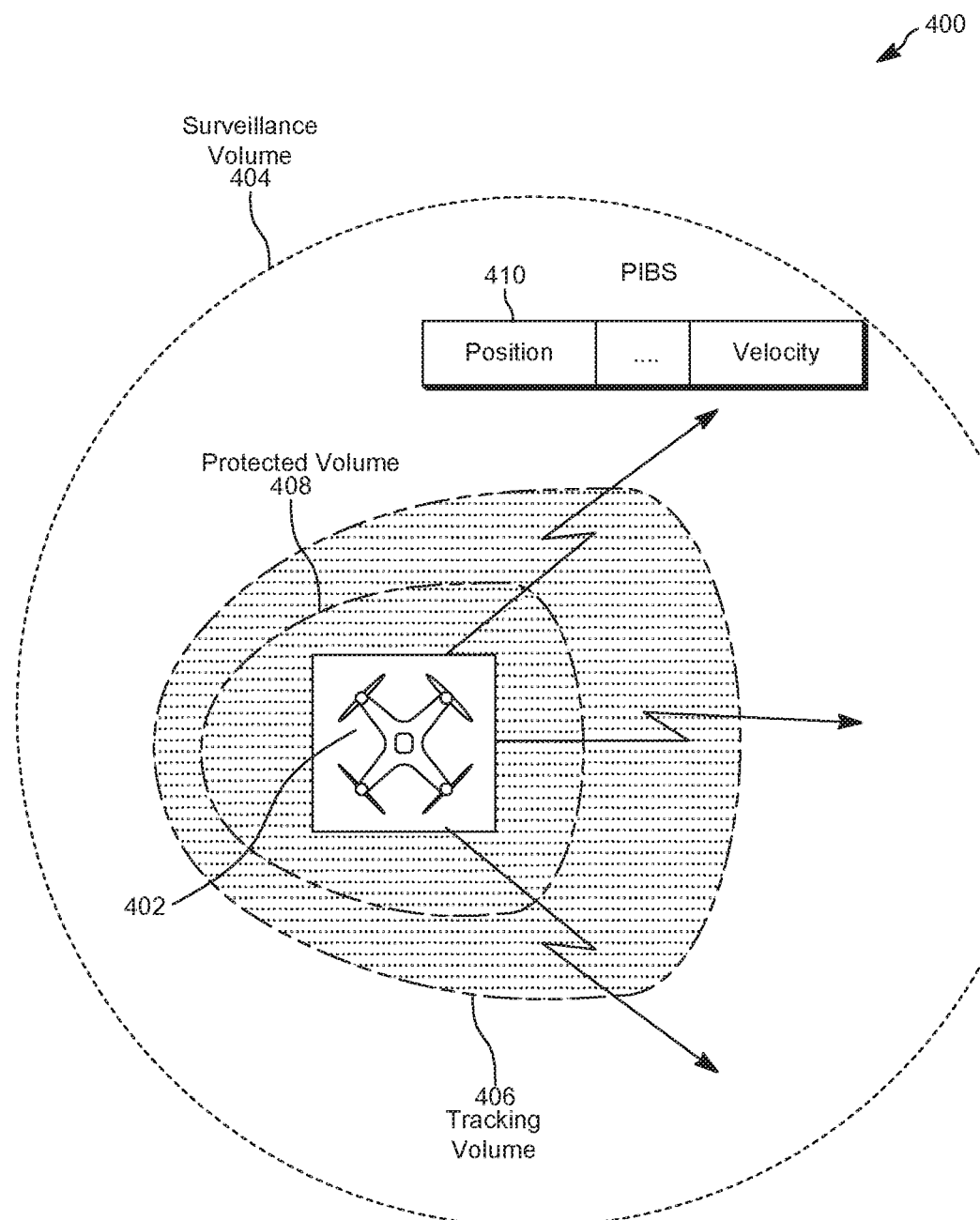
FIG. 4 is a diagram illustrating UAV AirSpace volumes according to an embodiment.

Referring now to FIG. 4, a diagram of UAV AirSpace Volumes 404 is illustrated. FIG. 4 illustrates a DAA protocol for manned aircrafts, the Traffic Alert and Collision Avoidance System/Airborne Collision Avoidance System (TCAS/ACAS), which is used between two flights to determine a potential collision risk. Similarly, PIBS-based DAA for UAS operations, in some embodiments, may be performed between two UAVs involving collision risks.

As shown, a UAV uses airspace volumes for the PIBS-based DAA process. The volumes include a Surveillance Volume (SV) 404, which is a UAV's maximum object detector coverage range. Another volume is a Tracking Volume (TV) 406, which is a Time-based region around the UAV within which the UAV actively tracks and avoids intruders and objects using available surveillance sensors, (including, PIBS, cooperative radio-based protocols and/or passive on-board sensors) in coordination with the intruders or UTM/USS, as available. Another volume shown is a Protected Volume (PV) 408, which is a Dynamic, time-based region around the UAV within which the UAV avoids collisions autonomously using active radio-based protocols/passive on-board sensors.

A UAV sends PIBS messages 410 with its position/velocity periodically over a broadcasting media. In accordance with some embodiments, PIBS messages are heard by UAVs 402 if the UAV is in their surveillance volume (SV).

Figure 5A:
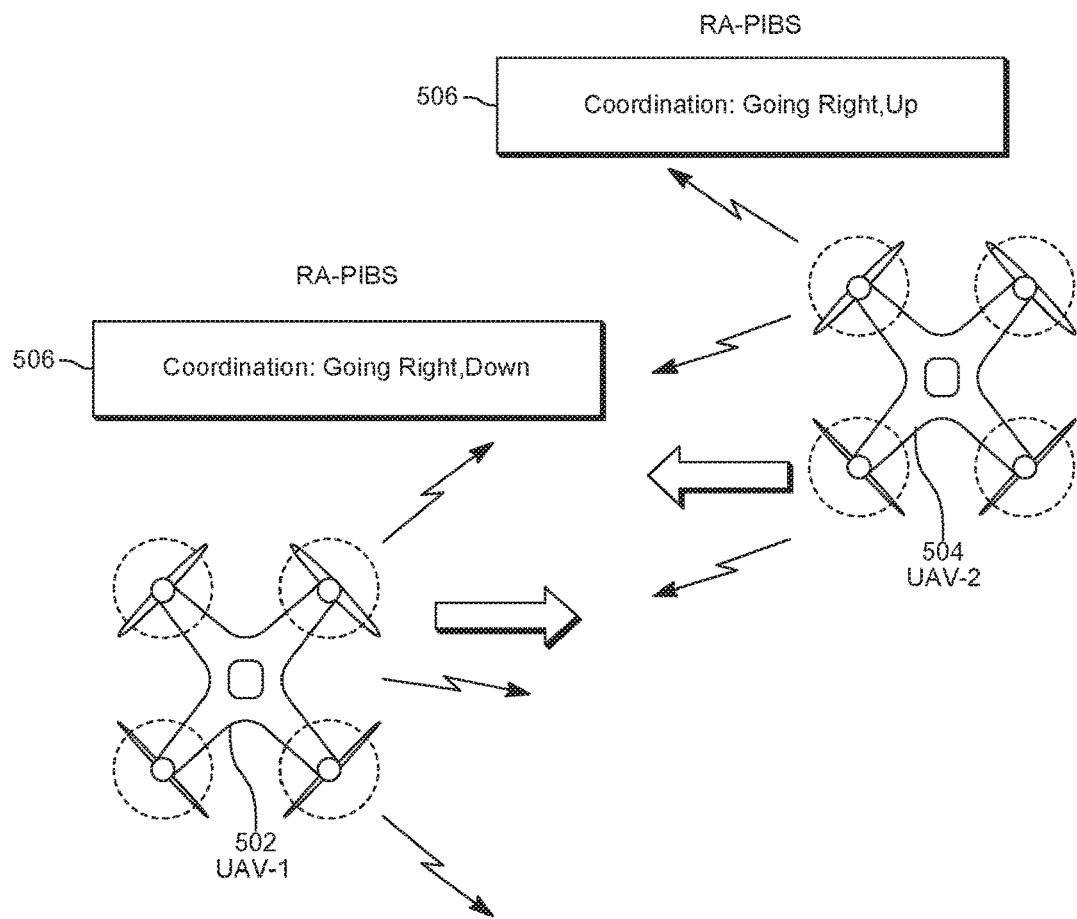
FIG. 5A illustrates a diagram of a cooperative DAA process according to an embodiment.

Referring now to FIG. 5A, a cooperative DAA process is shown in which both UAV-1 502 and UAV-2 504 send PIBS messages 506 and are tracked by each other in accordance with some embodiments.

Figure 5B:
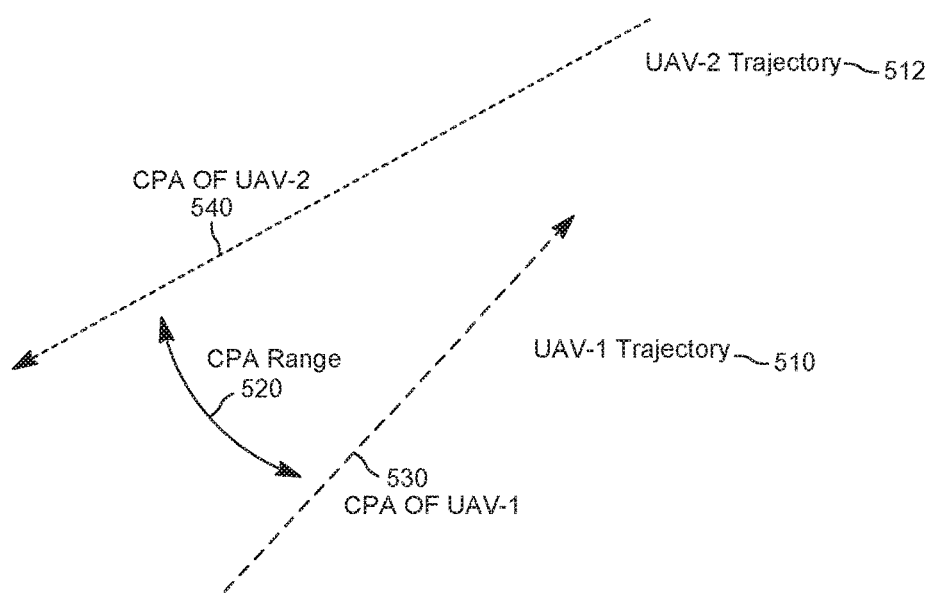
FIG. 5B illustrates a cooperative DAA process with trajectories according to an embodiment.

Referring to FIG. 5B, in some embodiments, UAV-1 knows its own trajectory 510 and estimates UAV-2's trajectory 512. If UAV-1 finds the closest point of approach (CPA) range 520 is less than the protected volume (PV), it predicts a collision risk. Next, the process in some embodiments, will derive a resolution advisory (RA) for the risk. The RA is included in the RA-PIBS and sent to UAV-2. The UAV-2 will do the same. If the RAs from UAV-1 and UAV-2 do not conflict, a pairwise RA is agreed. If not, a process to coordinate RAs may be executed.

FIG. 5A illustrates an RA-PIBS that is agreed upon that shows coordination going right and down for UAV-1 and coordination going right and up for UAV-2 506. FIG. 5B illustrates that the trajectories with the closest points of approach (CPAs) of UAV-1 530 and UAV-2 540 and the CPA range 520 using trajectory arrows.

When the potential collision risk is caused by non-cooperative objects, such as intruder, physical obstacles, a UAV must use its on-board sensors to detect and avoid (DAA) the objects. In some embodiments, a UAV may also use map information to better locate the obstacles, sometimes, dynamic. The dynamic map information may be provided, in some embodiments, by infrastructure sensors, such as cameras on the ground for blind spots.

Some embodiments herein related to path planning of UAVs that provide distributed detect and avoid (DAA) methods based on resource allocation using a market-based approach for conflict resolution for of multiple UAV path planning. More particularly, path planning of a UAV can be optimized using UTM before a start of a mission. Ideally, there will be no conflicts or changes of a UAV breaching another's safe zone, but there are unavoidable circumstances at times that require a UAV to deviate from a planned path that can conflict with other UAVs.

In some embodiments, a DAA method starts as soon as the UAVs reach a conflict zone. In some embodiments the determination is made based on safe operating distance of UAVs. At this point, the conflict zone is tessellated into grids and each grid cell can be envisioned as a resource that the agents (the UAVs) are trying to access. Some embodiments apply methods of economic markets such as demand-supply and auction methods for price/value updates and agent-level calculations. Applying economic principles from auctions and the like beneficially provides optimality, scalability, and ability to provide solutions that are fast enough to be responsive for dynamic changes.

The nomenclature used in embodiments disclosed herein include the following:

UAS Unmanned Aerial System, also referred to as Unmanned Aerial Vehicle (UAV), is a multirotor flying vehicle that has a frame with mounted sensors and motors with propellers. It is capable of talking to the UAS Operator via wireless telemetry, using LTE, Wi-Fi, or any other methods. It is also equipped with an autopilot and an Automated Dependence Surveillance-Broadcast (ADS-B).

UAS Operator is a person, or an organization, that is the in charge of the flying vehicles and is responsible for ensuring its airworthiness by proper maintenance.

NAS National Airspace System is the airspace, its facilities, and airports of the USA along with their rules, regulations, policies, personnel, and the like.

VLOS Visual Line-of-Sight, means that the system can be observed visually. The contrary term is BVLOS (Beyond VLOS) which means the system is not visible to an observer.

UTM UAS Traffic Management service is the main service that monitors and ensures that all the airborne UAS are operating in a safe manner. It also plans the flight path for these UAS as requested by the user through a GCS. The UTM talks to GCS through internet to receive mission plan requests and responds with an approval or denial. The UTM also talks to the Airspace Management Database that is shared with the Air Traffic Controllers for manned aircrafts. No-fly Zone A geo-fenced area that is restricted for general UAS to enter. This could be permanent, such as 400 ft. AGL or airports, or it could be temporary, such as construction or accident sites.

Waypoints are geo-coordinates of a location that will be visited by a UAS during its flight. They could be mandatory or optional.

Flight mission is a layout of the flight plan with a starting and end geo-locations, optionally but generally, with intermediate waypoints. It is basically trajectory information with timestamped waypoints to be visited. Additionally, it might include the tolerance around the area and/or the time where/when the UAS could be located.

Centralized Approach refers to a type of approach in which all the operations are handled by a central service.

Decentralized Approach refers to an approach that is opposed to centralized approach, the operations are handled by the services that are responsible for their respective coverage areas. Essentially, this is a combination of several centralized approaches talking to each other.

UAS State refers to the state of the UAS which includes the position and velocity information and additionally may include the health of the UAS, such as battery status, sensor health, and the like.

Obstacles refers to the locations in the environment that cannot be taken by the UAS or any other entity. These could be buildings, trees, and any other flying objects, including other UAS.

Non-cooperative/Rogue UAS refers to a UAS that has deviated from the prescribed flight plan by the UTM and behaving in a suspicious manner, which could be caused by system malfunction or malicious intent of the user or the like.

Pop-up threats refer to a threat to the UAS navigation that was not anticipated. This could include rogue UAV, or even un planned construction/accident sites.

C2 Command and Control refers to the method to send control commands to the UAS to ensure it follows the prescribed flight plan.

SAA Sense and Avoid is the capability to sense the obstacles (static or dynamic) and use obstacle avoidance algorithms to avoid collisions with those obstacles by flying around them at a safe operating distance.

Figure 6:
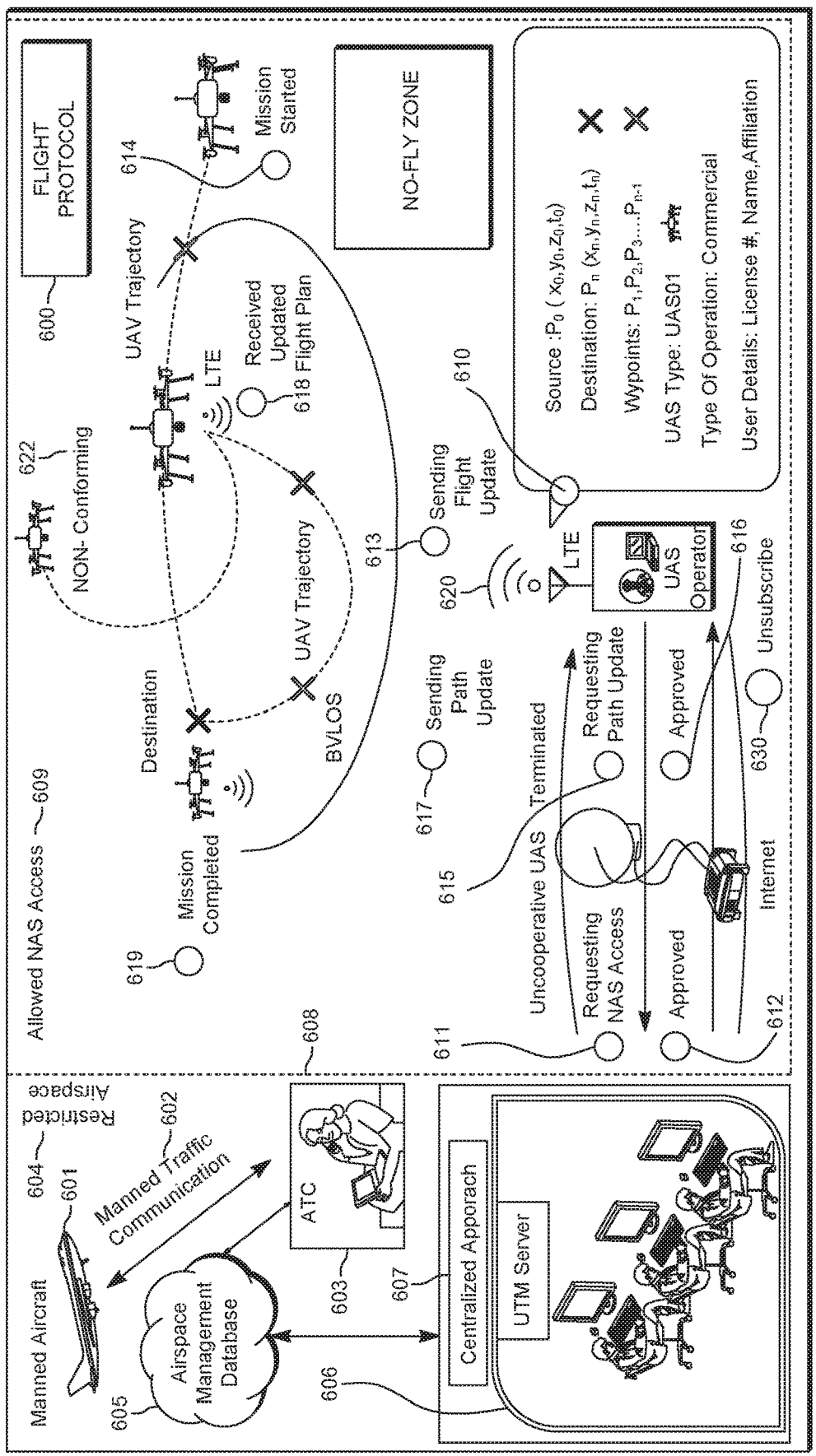
FIG. 6 is a diagram illustrating a flight protocol according to an embodiment.

Referring now to FIG. 6, a flight protocol in accordance with some embodiments is illustrated. Specifically, FIG. 6 shows a manned aircraft 601 communicating over a manned traffic communication 602 to air traffic control (ATC) 603 over restricted airspace 604. ATC 603 is coupled to Airspace Management Database 605 which is coupled to UTM Server 606 using a Centralized Approach 607. A line 608 separating restricted airspace from allowed NAS access space 609 is illustrated. Flight protocol over NAS space is illustrated as a series of steps.

As shown, in step 600, an operator provides information including coordinates for the UAV. As shown, the UAV shows: Source: $P_0(x_0, y_0, z_0, t_0)$; Destination: $P_n(x_n, y_n, z_n, t_n)$; Waypoints $P_1, P_2, P_3, \ldots P_{n-2}$; UAS type shown as UAS01; Type of operation: commercial; and User details, including a license number, name and affiliation. Also shown is step 611, wherein a UAS operator requests NAS access. More particularly, the UAS operator comes up with a desired mission, which can be approved in step 612. The request would include a starting point, a destination (which could be same as the starting point), optionally, the waypoints to visit, the time of flight, and additionally, some identification of their UAS, such as build type, type of sensors, capabilities, and the like. As shown in Step 613 as sending flight plan. Step 614 illustrates that the mission is started by illustrating a UAV. Step 615 illustrates a requesting path update. Step 616 illustrates that the path update would be approved by illustrating a UAS operator interacting with the internet. Step 617 illustrates sending the update over wireless by showing a sending path update over an antenna. Step 618 illustrates a UAV receiving an updated flight plan over LTE. Step 619 illustrates mission completed and an updated trajectory. Also shown is a non-conforming UAV illustrated and a flight path trajectory for the non-conforming UAV. A line is also displayed that illustrates an area that is beyond viewable line of sight (BVLOS). Step 630 illustrates that at the end of a flight, the UAV is unsubscribed from a connection.

Thus, in a normal implementation of a flight protocol, a UAS operator sends a demand to the UTM service. The UTM responds with an approval or denial. If approved, a detailed flight mission plan is returned, such as shown in Step 610 coordinates. If denied, the user may retry with a new request.

If the UAS operator received an approved flight plan, they can communicate this to their UAS through wireless link 620 as shown in FIG. 6.

The UAS then starts the mission according to the given flight plan. If the Actual Navigation Performance (ANP) of the UAS deviates from the Required Navigation Performance (RNP) by a prescribed limit, the UAS is considered as non-cooperative and goes into a rogue state. An occasional small deviation could be a result of noise in sensors or positioning and may be ignored.

In case of rogue UAS, such as Non-conforming 622, the UTM sends the mission abort commands to the UAS directly, thus forcing the UAS to end mission and land at the nearest safe location. In case the UAS operator comes up with a need to modify the original flight plan while the UAS is still flying, they may request a modification request to the UTM and an updated flight mission may be received. This change can be uploaded to the UAS directly or sent through the UAS operator. Step 617 illustrates the update. Step 618 illustrates the updated flight plan as received.

If the UAS completes the mission successfully, the UAS operator sends a mission report log and the UTM retains it. Once the mission report is received, the UTM stops monitoring that UAS and the UAS operator is unsubscribed (Step 630) from the UTM service until next mission.

Figure 7:
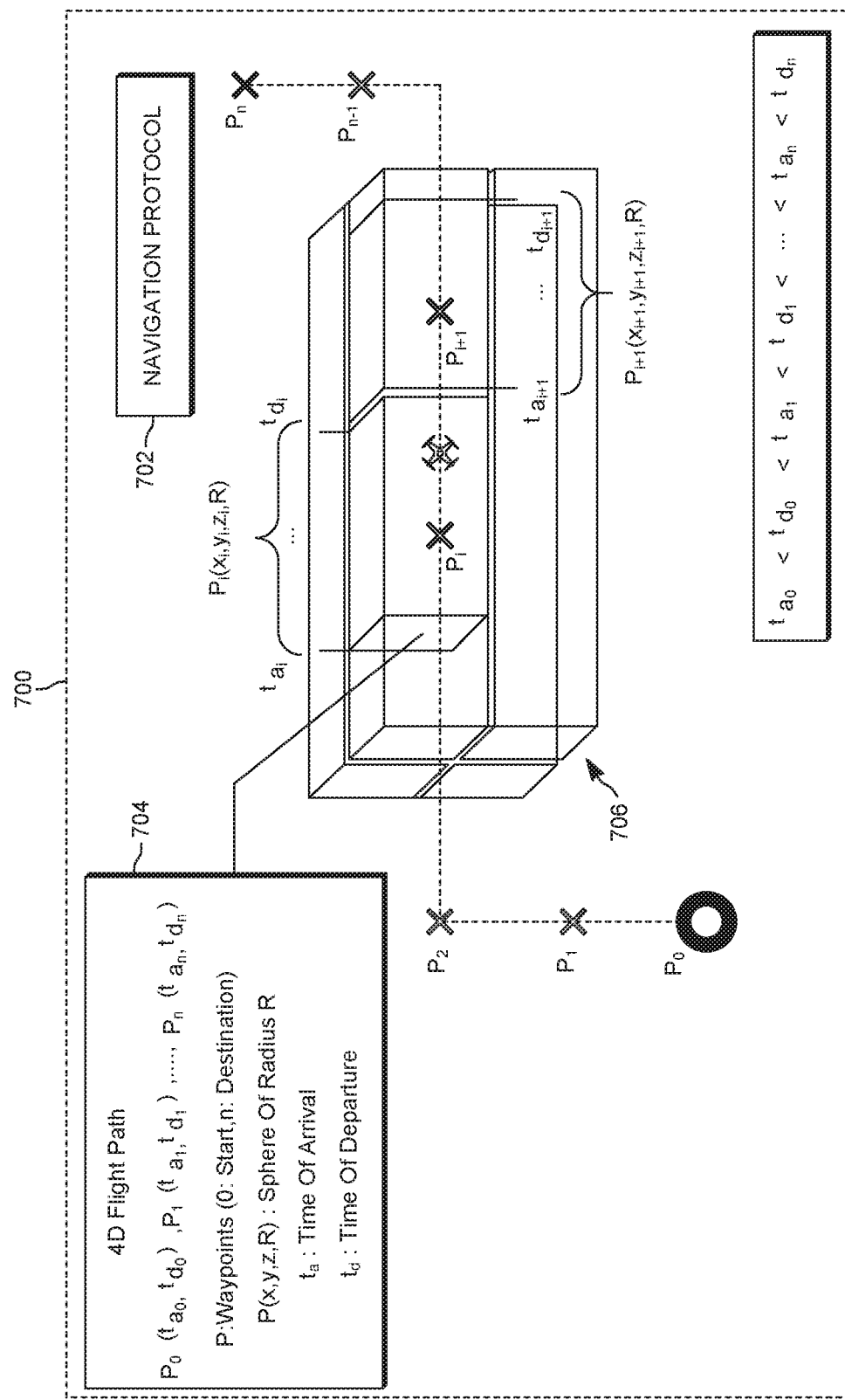
FIG. 7 is a diagram illustrating a navigation protocol according to an embodiment.

Referring now to FIG. 7, a schematic illustrates a navigation protocol 702 in accordance with some embodiments. A shown, a 4D flight path 704 can include multiple waypoints listed with P: waypoints (0:start, n: destination) and listed as P (x, y, z, R) where R represents the radius of a sphere. In the flight path 704, $t_a$ represents a time of arrival and $t_d$ represents a time of departure. Thus, a flight path can be represented by $P_0(t_{a0}, t_{d0})$, $P_1(t_{a1}, t_{d1})$, ..., $P_n(t_{an}, t_{dn})$. Also shown in FIG. 7 are different points shown as $P_0$, $P_1$, $P_2$, $P_i$, $P_{i+1}$, $P_{n-1}$, and $P_n$. The waypoint Pi is shown as $P_i(x_i, y_i, y_i, R)$ over a time period from $t_{ai} \ldots t_{di}$. Likewise, the waypoint $P_{i+1}$ is illustrated as over time period $t_{ai+1} \ldots t_{di+1}$ with point $P_{i+1}(X_{i+1}, Y_{i+1}, z_{i+1}, R)$ Also illustrated is a time block that is represented as $t_{a0} < t_{d0} < t_{a1} < t_{d1} < \ldots < t_{an} < t_{dn}$.

FIG. 7 also illustrates airspace 706 allocated to UAVs. In particular, the airspace below 400 ft. above ground level (AGL) in some embodiments is divided into N number of layers of an appropriate height depending on minimum safe operating radius. As the UAS operators request a flight path, a cuboid strip of airspace from the starting location to destination can be allocated to the user for the requested time. These airstrips will be divided into separate sections that will be reserved for the operator for a given time as shown by the time indication in FIG. 7. According to some embodiments, at any time instant, the UAS can be located within a given location only (with tolerances on location and time as will be determined with system requirements). In some embodiments, time instant locations make the airspace utilization more efficient by freeing up sections that the UAS has already passed through.

Figure 8:
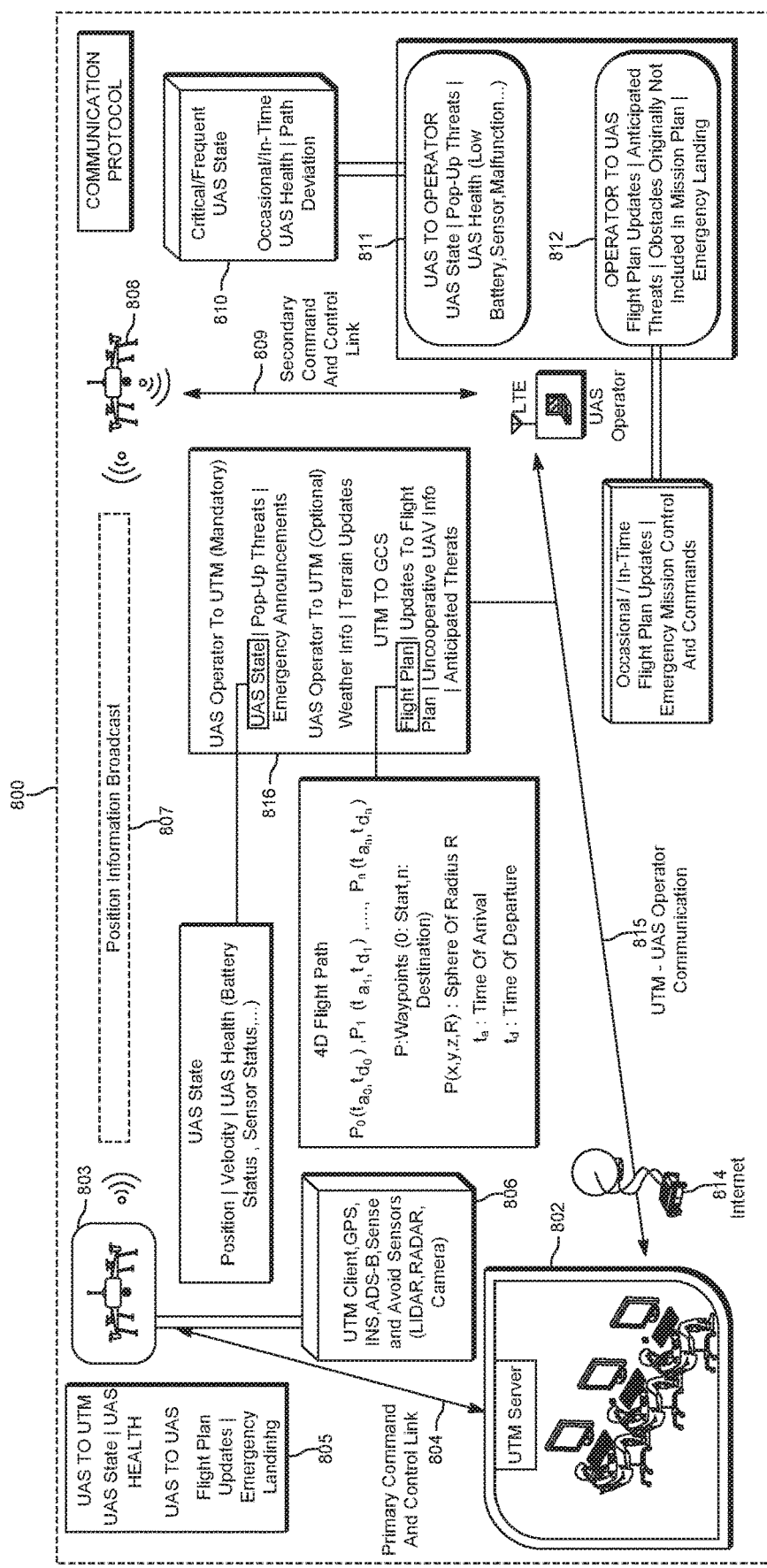
FIG. 8 is a diagram illustrating a communication protocol according to an embodiment.

Referring now to FIG. 8, a communication protocol 800 is shown. The UTM server 802 is shown communicating with a UAV 803 over a primary command and control link 804 that includes communications from UAS to UTM of UAS state and UAS health. The UTM communicates to the UAS the flight plan, updates and any emergency landing data 805. Also shown is a UAV that can include a UTM client, a global positioning system (GPS), an INS, an ADS-B, Sense and Avoid sensors via LIDAR, RADAR and/or a camera shown in block 806. The UAV also broadcasts position information 807. Also shown is a second UAV 808 that can be connected over a secondary command and control link 809, such as LTE. In some embodiments, the secondary command and control link and supply critical/frequent UAS state data, occasional/in-time UAS health and path deviation data 810. Data passed between a UAS to an operator 811 can include UAS state, pup-up threats, UAS health such as low battery or sensor malfunction. Data passed from an operator to a UAS 812 can include flight plan updates, anticipated threats/obstacles originally not included on a mission plan and emergency landing data. Additional data from the operator to the UAS can include in some embodiments, occasional/in-time data such as flight plan updates, and emergency mission control and command data.

Also shown in FIG. 8 is Internet 814 and UTM to UAS operator communications 815. As shown, the UAS Operator to UTM communications 816 can include mandatory communications 816 such as UAS state data, pop-up threats and emergence announcements. UAS state data can include position, velocity, and UAS health data such as battery status and sensor status. UAS operator to UTM data can be optionally provided and include weather information and terrain updates. UTM to GCS can include a flight plan, updates to a flight plan, uncooperative UAV information and anticipated threats. The flight plan can be a 4D flight plan with waypoints and sphere radius and time of arrival and departure for each waypoint.

FIG. 8 illustrates that a primary command and control 804, such as a C2 link may be set up between the UTM server 802 and the UTM client onboard the UAS 803 according to some embodiments. The C2 link, in some embodiments, may be the primary mode of communication between the UTM service and the UAS. The UTM receives the state of the UAS through the C2 link that will include position, velocity, and the health of the UAS (such as battery status, sensor status, etc.). In some embodiments, a secondary C2 link 809 exists between the UAS operator and the UAS, that may be used if needed. For instance, the onboard autopilot will be aware of the environment and strategies for a successful mission through the primary C2. However, there might be cases when sudden changes in environment arise, such as accident sites, medevac instances, and the like which would require the UAS to change a mission course.

When a mission course changes, a UAS may ask the operator to supply the UAS with proper strategies to continue its mission. Another example could be if the operator decides to abort the mission prematurely, the C2 link can communicate the abort commands directly to the UAS. The UTM to UAS Operator communication in some embodiments can instantiate/subscribe to the UTM service. In some embodiments, subscribing/instantiating can include environmental updates, such as weather information, terrain updates, emergency announcements, and the like. The UAS in some embodiments can subscribe to other agents' position through an onboard Position Information Broadcast (PIB) System. The onboard PIB in some embodiments includes the position and velocity information of the agents, that in some embodiments become vital in making SAA decisions.

Figure 9:
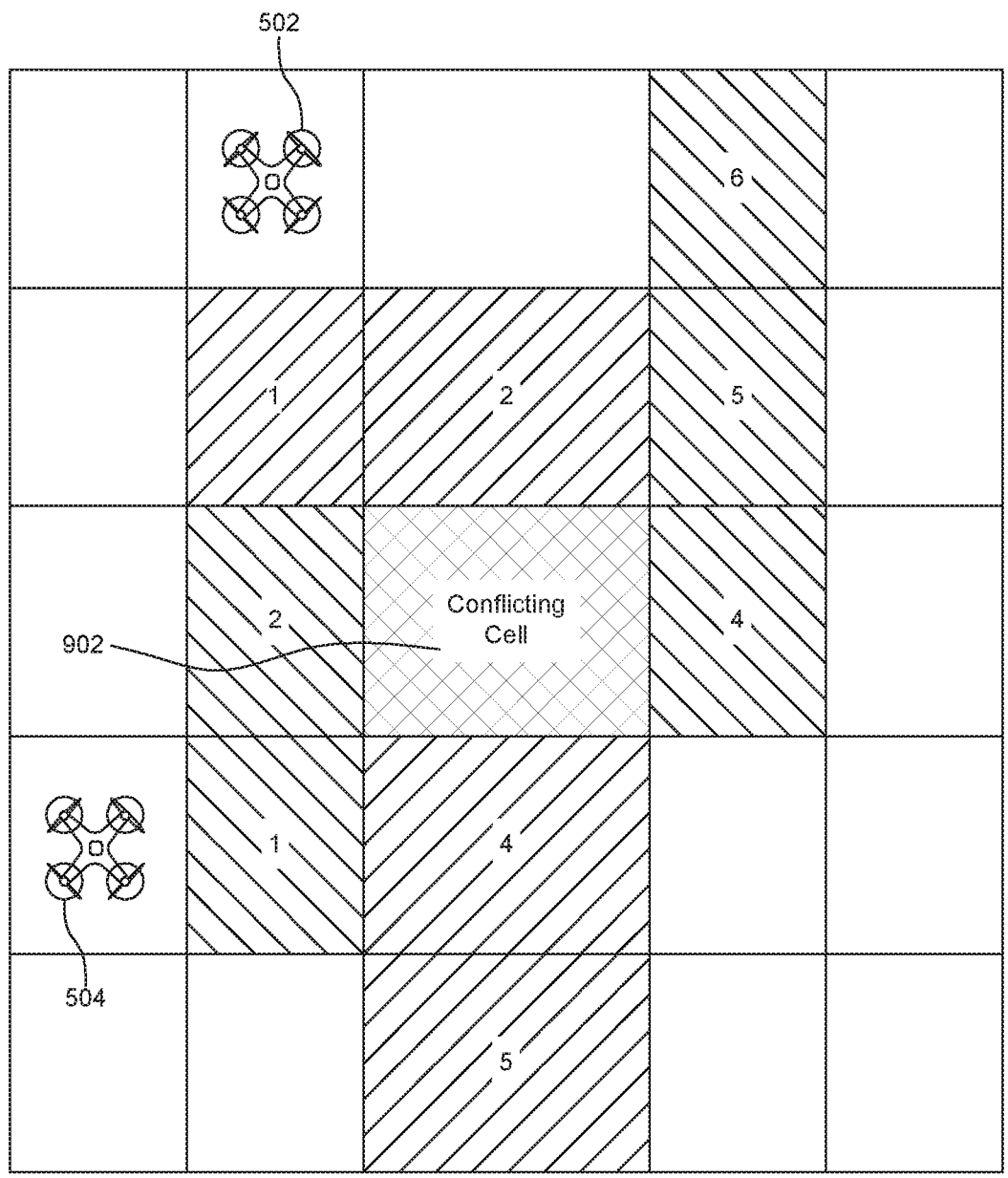
FIG. 9 is a table illustrating different conflict zones illustrating a conflict according to an embodiment.

Referring back to FIGS. 5A and 5B and FIG. 9, embodiments herein are directed to a market-based approach to resolve conflicts such as the conflict illustrated. In some embodiments, a UAS situated UTM-client can implement methods that resolve conflicts in a semi-distributed sense. The conflict zone 902 illustrated in FIG. 9 for the case of two UAVs, 502 and 504 under conflict illustrates some embodiments. The multiple UAV resource allocation problem can be mathematically formulated as:

$$\min \Sigma_{t=t_s}^{t_r} \Sigma_{i=1}^{n_r} \Sigma_{j=1}^{n_a} a_{ij,t} x_{ij,t} \qquad \text{Eq. 1}$$

such that $\Sigma_{i=1}^{n_r} x_{ij,t} = 1, \forall j=1,2,\ldots,n_a$ $\qquad$ Eq. 2

$\Sigma_{j=1}^{n_a} x_{ij,t} \leq N_{i,t} \; \forall i=1,2,\ldots,n_r$ $\qquad$ Eq. 3

Here, i is the index for 3D space tessellated in a cellular grid fashion, which can also be referred to herein as a resource. j is the index for the agents, i.e., the UAVs. Hence, the above equation for $n_r$ resources (3D cells) and $n_a$ agents, $x_{ij,t}$ is the decision binary variable which is 1 when the resource i is being used by the agent j, and 0, otherwise, at time t. The cost function, $a_{ij,t}$ in Eq. (1) represents the known profit of agent j in utilizing resource i at time t. $t_s$ and $t_r$ represent the start time for the conflict and the time at which all conflicts have been resolved, respectively.

In some embodiments, each UAV utilizes a resource as given in Eq. (2) and each resource in some embodiments may be utilized by no more than $N_i$ agents according to Eq. (3).

In some embodiments, the above problem is attempted in an iterative manner by each agent as follows:

$$\text{minimize } \Sigma_{i=1}^{n_r} a_{ij} x_{ij,t} - \Sigma_{i=1}^{n_r} (p_{ij})_k x_{ij,t} \qquad \text{Eq. 4}$$

where, $(p_{ij})_k$ represent the price of the resource $x_{ij}$. In some embodiments, the mechanism for price update is based on the concept of demand-supply that uses information about the total number of requests made on a resource and its constraints to update the price:

$$(p_i)_{k,t} = (p_i)_{k-1,t} \alpha (\Sigma_{j=1}^{n_a} x_{ij,t} - N_{i,t}) \qquad \text{Eq. (5)}$$

In some embodiments, a system includes a UTM-client situated on an UAS that implements a market-based approach for a semi-distributed DAA conflict resolution.

As used herein, the price concept represents a likelihood of conflict for a resource/cell. Thus, price is a value representative of likelihood of conflict or a potential for conflict. Thus, minimizing a summation that includes an amount spent on a desired path.

In some embodiments, a communicating body is required to keep an account of cell costs, $p_{ij}$, for a conflict zone. In some embodiments, the cell costs are communicated to UAVs under conflict through an Edge-UTM that serves as a conflict-resolution advisory for the time of a conflict.

In some embodiments, the UAS hosts an UTM client that carries out DAA based on information provided by an Edge UTM as shown in FIG. 6.

In some embodiments, a method for carrying out DAA includes sharing, by a UAV one or more paths to an Edge-UTM in a region monitored by the Edge-UTM; and revising a price of one or more three-dimensional (3D) grid cells if a conflict is detected in the one or more 3D grid cells. In some embodiments the price in a conflict zone is zero or initially zero.

In some embodiments, the method includes updating a trajectory by the UAV if a conflict is detected and sharing the updated trajectory with the Edge-UTM. In some embodiments, a trajectory is determined based on an optimization arrived at by minimizing a summation equation including the price/value associated with the trajectory update, such as Equation 4. In some embodiments, an Edge-UTM receiving information from UAVs under conflict checks for conflicts and if all conflicts have not been resolved, performing a price update and communicating a determined cost to the UAV.

Some embodiments include receiving environment configuration data from an Edge-UTM including one or more of grid size, cell resolution and a suitable time horizon parameter. For example, a $t_{detect}$ parameter for UAVs receiving the environment configuration from the Edge-UTM, such as grid size, cell resolution, a and $t_{detect}$ parameter (i.e. a suitable time horizon).

In some embodiments, the method includes sending by UAVs state data, which can include sending data to an Edge-UTM. State data can include one or more of intended waypoints of a mission, current position and identification of cells to be visited for $t_{detect}$ time steps. For example, equation (4) and (5) provide for a UAV sending an its $x_{ij,t}$ value for next $t_{detect}$ time steps.

The method further can include, in some embodiments, receiving from an Edge-UTM determined new values associated with a price for avoiding conflicts over a region for a determined time. The time can be tuned based on practical scenarios.

In some embodiments, the method includes receiving a communication for values associated with any cells that are in conflict, and any non-zero valued grid cells that identify conflicted areas in an environment. In some embodiments, all cells can be set to zero as a "price" meaning that the identified cells do not have a present conflict.

Equation 5 can be used to determine "price" values for conflicts and include UAV receiving updated prices for a predetermined number of grid cells in a time horizon. In some embodiments, the method includes determining, by a UAV a new path based on pricing associated with a current grid, wherein the pricing is based on optimization represented by Equation 4.

After a UAV determines a new path, the method includes communicating the new path to an Edge-UTM and iterating until no more conflicts remain. In some embodiments, a time period over which grid cell conflict prices do not change identifies a stabilization of grid cells and resolution of conflicts.

Referring now to FIG. 10, a schematic diagram 1002 illustrates some embodiments wherein UAVs are under conflict. As shown, UAVs 1004, 1006 and 1008 are illustrated as UTM-clients in which some are performing detect and avoid (DAA) conflict resolution. Each UTM-client is shown in a different grid cell that can be known to an Edge-UTM 1010. The perimeter circle 1020 identifies three UTM-clients 1004, 1006 and 1008 that are under conflict, "UAVs under conflict" and the conflicting cell 1022 is identified. As shown, in accordance with some embodiments, identifications of waypoints 1024, 1026 and 1028 are communicated from each UAV to an Edge-UTM which performs calculations to determine cell values as a cost determination. The Edge-UTM transmits to each UAV a $p_{ij}$ 1034, 1036, 1038 identifying the conflicting cell as having a price that is not zero, meaning that a conflict is present. A UAV receiving the price for a cell that is on a current path determines a new path.

Market-Based DAA

In accordance with some embodiments, method includes market-based decision making for avoiding conflicts. One aspect of the method includes UTM client instantiation. In particular, an Edge-UTM in some embodiments, is configured to receive one or more requests for UAV missions. An Edge-UTM may be configured to always be listening for such requests. Missions herein refer to a collection of waypoints as intended locations for a UAV. For example, in a scenario wherein a number of UAVs make a request to an Edge-UTM to carry out their respective missions, the Edge UTM instantiates a session with an on-board Edge UTM client and responds with a mission plan that includes the trajectory information for each UAV. The Edge-UTM performs initial path planning that takes into account the current state of the region under the Edge UTM's jurisdiction. Since an area can contain various obstacles and no fly zones, and other preexisting cell blockages, these are already taken into account while planning a UAV path by the Edge UTM as well as the current UAVs flying in the region. In some embodiments, an Edge-UTM has global information about all the UAVs flying in its region. In some embodiments, the Edge-UTM receives global information to accommodate further UAVs that enter the region at any time in future.

In some embodiments, a UAV starts a mission at will, and in practical scenarios, operational delays can cause a UAV to deviate from a prescribed trajectory. Navigational performance and tolerances can further cause a UAV to deviate from a path and cause a conflict in a planned path of two or more UAVs.

The Edge UTM, through the ground-based sensors and PIBS information coming from the UAVs, can predict a conflict and alert the UAVs in advance. At $t_{detect}$ parameter, which may also be referred to as time horizon, dictates how many time steps in advance to look for conflicts. As soon as a conflict is detected, the Edge UTM sends an alert message to the conflicting UAVs along with the environment configuration. This configuration includes the information on grid size, cell resolution, and the $t_{detect}$ parameter.

In some embodiments, an Edge-UTM server and a UTM client UAV interact by the UAVs starting to the state information to the Edge UTM. The state vector includes position and intended waypoints in the imminent time horizon. The Edge UTM computes the new grid cell prices based on Equation 5 and sends these out to the UAVs under conflict. In some embodiments, the Edge UTM communicates grid cell costs/prices of any cell under conflict to one or more UAVs as clients predicted as being impacted by the conflict. In some embodiments, the Edge-UTM communicates only the prices for the grid cells that changed in a particular iteration. In some embodiments, non-changing cells are assumed to have a cell price of zero representing no conflict.

In some embodiments, a method includes UAVs receiving communications from an Edge-UTM server that includes grid cell prices to enable the UAVs under conflict to determine an alternate path. In some embodiments the new path is determined based on an optimization equation, such as Equation 4, which minimizes a cost of a path in a mission. Each UAV decides its own path independent of other UAVs' decisions. Each UAV path may be different, longer, less resourceful, and, in general, not the shortest way to their goal. All the UAVs under conflict send their respective modified path information to Edge UTM. In some embodiments, the modified path data is a state vector.

In some embodiments, an Edge-UTM receives modified paths, and updates a price of grid cells based on the received modified paths, since the modified paths may again have conflicts, the price of grid cells are again subject to change. The change can be based on Equation 5. In some embodiments, an Edge-UTM executes Equation 5 with all UAVs' modified paths to arrive at revised prices of the grid cells. The UAVs iterate by again revising mission paths as necessary with the Edge UTM until no more conflicts remain, as determined by the stabilized prices of the grid cells.

In some embodiments, a market-based approach applies when there is an addition or deletion of UAVs (due to new UAVs arriving or departing) in the conflict scenario. When a new UAV arrives in the conflict zone, the UAV communicates path information to the Edge UTM, which uses new UAV information in its calculation of grid prices. Similarly, upon departure of a UAV from the scene, Edge UTM does not consider its path information and may remove data related to a departed UAV. In some embodiments, interactions with UAVs are localized to include only UAVs affected by a conflict.

Auction-Based DAA

In some embodiments, a conflict resolution can be fully distributed by implementing an auction-based approach. More particularly, a method according to some embodiments is directed to assigning rewards and costs to each path or trajectory that is possible for a UAV. Thus, a rule can be assigned for each UAV to choose a path that provides a maximum in profit. The profit herein can, in some embodiments, be defined as reward minus cost. Thus, a reward is function of path length, resource (cell) availability, energy requirements, and the like associated with each path. The cost is the bid that the UAV makes for a given path. For example, when a UAV transmits updated path information to an Edge-UTM server. Initially, all UAVs stick to one path. In case of conflict, they switch to other paths that maximizes their profit. Bidding can be performed via updates sent to an Edge-UTM server until the UAVs can no longer find any path that provides them a positive profit.

In an auction based fully distributed DAA—distributed greedy approach, a method can include in some embodiments, one or more UAVs detecting a conflict based on their on-board sensor data and from PIBS/ground sensors or the like. Next, the UAVs can bid on a desired path based on a profit using profit as reward minus cost. The reward can be the gain in following the desired path, in terms of parameters such as path length, resource availability, energy requirements, while minimizing any bid value spent on a desired path. The cost can be a bid value that is spent on the desired path. Thus, a UAV tries to maximize the profit while trying to secure the desired path. And UAVs may bid only up to their profit margin. As soon as profit starts getting zero or negative, the UAVs may choose not to up their bid.

Figure 11:
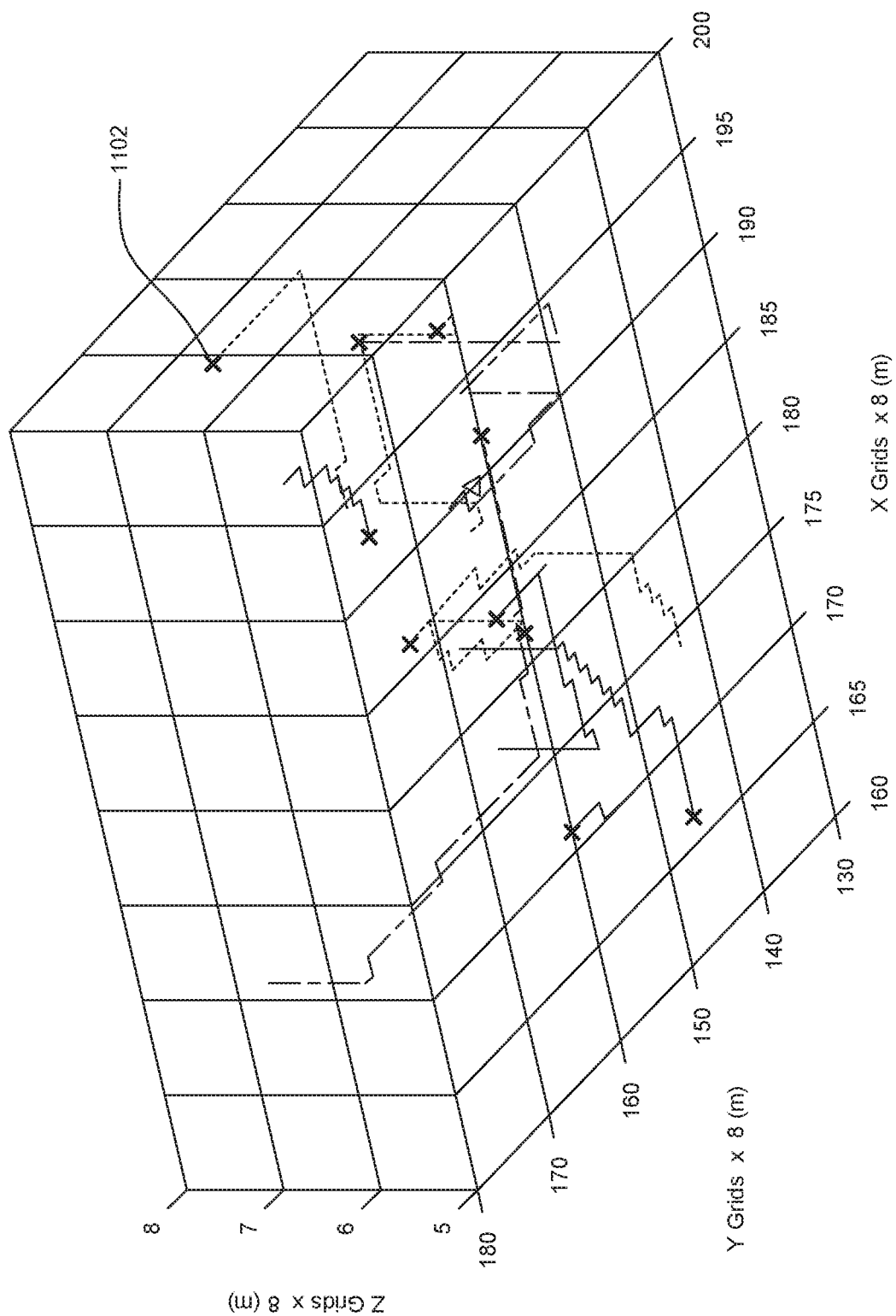
FIGS. 11-12 are three-dimensional diagrams illustrating flight paths in accordance with an embodiment.
Figure 12:
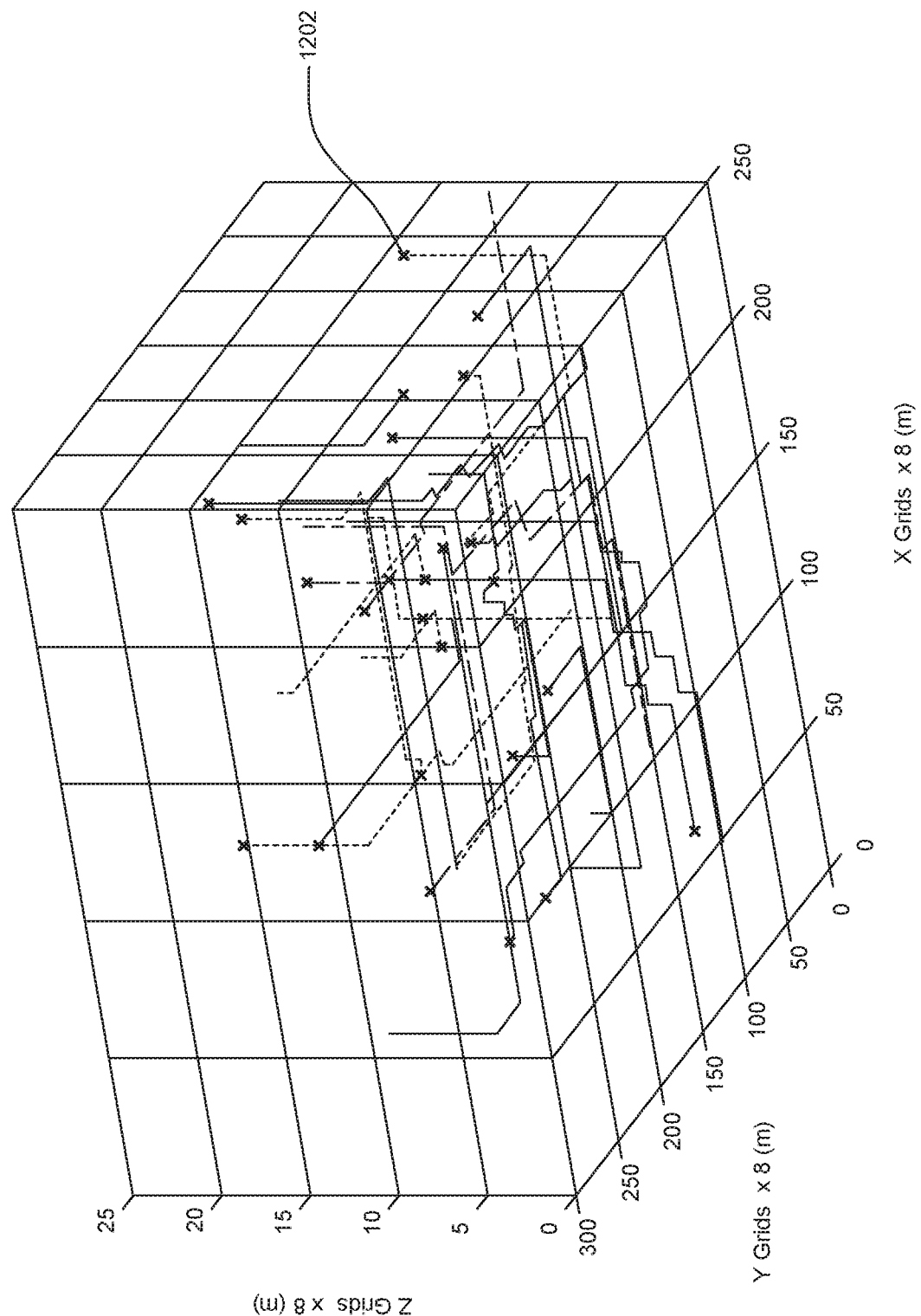

Referring now to FIGS. 11 and 12, different path planning of UAVs in a simulation environment are shown. Specifically, FIG. 11 illustrates path planning for ten UAVs shown with "x"'s such as 1102, FIG. 12 illustrates path planning for 25 UAVs shown with "x"'s such as 1202. The paths are determined using the methods disclosed for one or more embodiments. For example, in an environment of 1.25 mi×1.25 mi with a maximum height of 500 ft (2 km×2 km×152 m) in the downtown area of the city of Cincinnati, UAVs are allowed to fly between 50 ft and 500 ft only. The grid size is chosen as 8 m×8 m×8 m. Multiple UAVs with random start and destination locations start their mission at different times. To introduce operational delays in the system, the simulations have assumed that 10% of the UAVs get delayed randomly by a uniformly distributed delay period of a maximum of 10 time steps. Thus, some of the UAVs will start later than their proposed time of start.

FIGS. 11 and 12 illustrate a number of scenarios for different number of UAVs with different start and destination positions. For 10 UAVs, FIG. 11 illustrates that a smaller area provides conflicts observed and demonstrates some embodiments of systems and methods disclosed. The destination of each UAV is shown by a 'x'. It should be noted that the axes represent the grids in the figures. The conflicting cell may be identified by a triangle. To extend this, FIG. 12 shows the path planning over the whole simulation environment for 25 UAVs.

In some embodiments, a conflict resolution can be fully distributed by implementing an auction-based approach. More particularly, a method according to some embodiments is directed to assigning rewards and costs to each path or trajectory that is possible for a UAV. Thus, a rule can be assigned for each UAV to choose a path that provides a maximum in profit. The profit herein can, in some embodiments, be defined as reward minus cost. Thus, a reward is function of path length, resource (cell) availability, energy requirements, and the like associated with each path. The cost is the bid that the UAV makes for a given path. For example, when a UAV transmits updated path information to an Edge-UTM server. Initially, all UAVs stick to one path. In case of conflict, they switch to other paths that maximizes their profit. Bidding can be performed via updates sent to an Edge-UTM server until the UAVs can no longer find any path that provides them a positive profit.

In an auction based fully distributed DAA—distributed greedy approach, a method can include in some embodiments, one or more UAVs detecting a conflict based on their on-board sensor data and from PIBS/ground sensors or the like. Next, the UAVs can bid on a desired path based on a profit using profit as reward minus cost. The reward can be the gain in following the desired path, in terms of parameters such as path length, resource availability, energy requirements, while minimizing any bid value spent on a desired path. The cost can be a bid value that is spent on the desired path. Thus, a UAV tries to maximize the profit while trying to secure the desired path. And UAVs may bid only up to their profit margin. As soon as profit starts getting zero or negative, the UAVs may choose not to up their bid.

Some embodiments of a method may include receiving, by an unmanned aircraft system (UAS) traffic management (UTM) server one or more intended trajectories from one or more unmanned aerial vehicles (UAVs); determining, by the UTM server one or more conflicts based on the intended trajectories intersecting over a region monitored by the UTM server; and communicating, by the UTM server the one or more conflicts, the communicating can include assigning a value to each of a plurality of three-dimensional (3D) grid cells representing the region monitored by the UTM server, each value representative of a potential for conflict associated with a grid cell; and transmitting, to the one or more UAVs, value data associated with the plurality of grid cells.

In some embodiments, the method also includes iteratively receiving by the UTM server one or more updates to the one or more intended trajectories from the UAVs, the one or more updates determined by optimizing the one or more intended trajectories by minimizing a summation representing locations, time and value representative of potential for conflict of each of the intended trajectories; and iteratively communicating, by the UTM server to the one or more UAVs, updated value data associated with the plurality of grid cells.

In some embodiments, the iteratively communicating updated value data includes communicating to the one or more UAVs grid cells with the potential for conflict.

In some embodiments, the updated value data is based on a determination including $(p_i)_{k,t} = (p_i)_{k-1,t} + \alpha(\Sigma_{j=1}^{n_e} x_{ij,t} - N_{t,t})$ $a_{ij}$ represents a known profit of UAV j in utilizing the grid cell i along its trajectory, $x_{ij,t}$ is the binary variable that represents the occupancy of grid cell i by the UAV j, and t represents a time, and N represents a maximum number of UAVs permitted a cell in the plurality of grid cells $x_{ij}$ and $(p_{ij})_k$ represents value of the cell.

In some embodiments, the plurality of 3D grid cells is a tessellated area including at least a conflict zone determined based on a safe operating distance between the one or more UAVs. In some embodiments, each UAV operates as a client with the UTM server, each UAV separately determining an updated trajectory using the value data received by the UTM server.

In some embodiments, each UAV determines the optimization by determining a minimization of $\Sigma_{i=1}^{n_r} a_{ij} x_{ij,t} - \Sigma_{i=1}^{n_r} (p_{ij})_{k,t} x_{ij,t}$ wherein IN represents value data, $a_{ij}$ represents a known profit of UAV j in utilizing the grid cell i along its trajectory, $x_{ij,t}$ is the binary variable that represents the occupancy of grid cell i by the UAV j, and t represents a time.

In some embodiments, the UTM server is an edge-UTM server operating over a mobile edge computing (MEC) environment.

In some embodiments, a time period over which a grid cell of the plurality of 3D grid cells has a value that does not change identifies a stabilization of the grid cell.

Some embodiments are directed to a method including transmitting, by an unmanned aerial vehicle (UAV) running a client of an unmanned aircraft system (UAS) traffic management (UTM), a flight plan over a region monitored by a UTM server; receiving at the UAV a set of values, each value representative of a conflict likelihood associated with a grid cell of a plurality of three-dimensional (3D) grid cells of the region monitored by the UTM server; as a function of the set of values, updating the flight plan to minimize the set of values by reducing the conflict likelihood associated with the plurality of 3D grid cells; transmitting by the UAV the updated flight plan to the UTM server; receiving, at the UAV, an updated set of values; and determining a final flight plan based on the updated set of values if the updated set of values are unchanged or zero.

Other embodiments of a method include receiving, by an unmanned aerial vehicle (UAV), an environment configuration from a traffic management system server, the environment configuration including at least a size of a tessellated grid of cells representative of a conflict zone, a resolution of the grid of cells and a suitable time horizon parameter representative of a required time for conflict detection; transmitting, by the UAV, one or more of a position and a set of one or more grid cell identifiers representing waypoints; receiving, by the UAV, for a given time period, a set of values associated with identified cells of the grid of cells, the set of values identifying a likelihood of conflict for one or more of the identified cells; and determining, by the UAV, an updated set of the one or more grid cell identifiers if the set of values identifying the likelihood of conflict is non-zero.

In some embodiments, the method includes iteratively determining, by the UAV, updated sets of the one or more grid cell identifiers until the received sets of values associated with identified cells stabilizes. In some embodiments, the determining, by the UAV, the updated set of the one or more grid cell identifiers if the set of values identifying the likelihood of conflict is non-zero includes performing an optimization of the set of values by determining a minimization of $\Sigma_{i=1}^{n_r} a_{ij} x_{ij,t} - \Sigma_{i=1}^{n_r} (p_{ij})_{k,t} x_{ij,t}$, wherein $p_{ij}$ represents value data, au represents a known profit of UAV j in utilizing the grid cell i along its trajectory, $x_{ij,t}$ is the binary variable that represents the occupancy of grid cell i by the UAV j, and t represents a time.

In some embodiments, the receiving, by the UAV, for the given time period, the set of values associated with identified cells of the grid of cells, the set of values identifying the likelihood of conflict for the identified cells includes receiving, by the UAV the set of values determined by the traffic management server in proximity of the UAV, wherein the traffic management server calculates each value as $(p_i)_{k,t} = (p_i)_{k-1,t} + \alpha(\Sigma_{j=1}^{n_a} x_{ij,t} - N_{i,t})$ wherein $x_{ij,t}$ is the binary variable that represents the occupancy of grid cell i by the UAV j, and t represents a time, and N represents a maximum number of UAVs permitted a cell in the plurality of grid cells $x_{ij}$ and $(p_{ij})_k$ represents value of the cell.

In some embodiments, the traffic management server is an unmanned aircraft system (UAS) traffic management (UTM) edge server (Edge-UTM server).

In some embodiments the conflict zone is a region under the Edge-UTM server's jurisdiction, the conflict zone including one or more of obstacles and no-fly zones. In some embodiments, the Edge-UTM server maintains information about each UAV flying in the conflict zone.

In some embodiments, the method also includes transmitting, by the UAV, a position, velocity and intent broadcasting signal (PIBS) message.

In some embodiments, the PIBS message is transmitted by the UAV to an access network node and forwarded to the traffic management server.

In some embodiments, a method includes detecting by an unmanned aerial vehicle (UAV), a conflict in a cell of a tessellated grid of cells representative of a conflict zone, the conflict predictive of a collision in the cell along a planned flight path; and determining, by the UAV, a bid for a revised flight path based on a profit calculation wherein profit includes path length, availability of one or more cells in the conflict zone, and energy requirements; and transmitting the revised path.

In some embodiments, the determining, by the UAV, a bid for a revised path based on a profit calculation, further includes applying a conflict zone rule by the UAV for choosing a path through the conflict zone that maximizes the profit for each UAV in the conflict zone, determining a bid based on the rule, and transmitting the bid via an update sent to an unmanned aircraft system (UAS) traffic management (UTM) server until the UAV can no longer identify a path that provides a positive profit.

In some embodiments, the determining the bid based on the rule includes determining a profit margin, the profit margin being zero or negative precluding the UAV from increasing the bid.

In some embodiments, the determining, by the UAV, a bid for a revised flight path based on a profit calculation further includes determining the profit calculation via one or more of on-board sensor data, position, velocity and intent broadcasting signal (PIBS) messages, and ground sensors.

In some embodiments, the method for the UAV includes receiving from an unmanned aircraft system (UAS) traffic management (UTM) server a confirmed flight path based on a plurality of received bids from each UAV in the conflict zone, the confirmed flight path being the result of an auction based on the plurality of received bids, each bid including a determination of the profit calculation minus a cost associated therewith.

In some embodiments, the cost associated with each bid includes at least one or more of increased path length, reduced resource availability, and increased energy requirements.

In some embodiments, the conflict zone is a region under UTM server's jurisdiction, the conflict zone including one or more of obstacles and no-fly zones.

Some embodiments include a processor and a non-transitory computer-readable storage medium storing instructions operative when executed on the processor to perform the methods herein described.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions may take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Example Networks for Implementation of the Embodiments

Figure 13A:
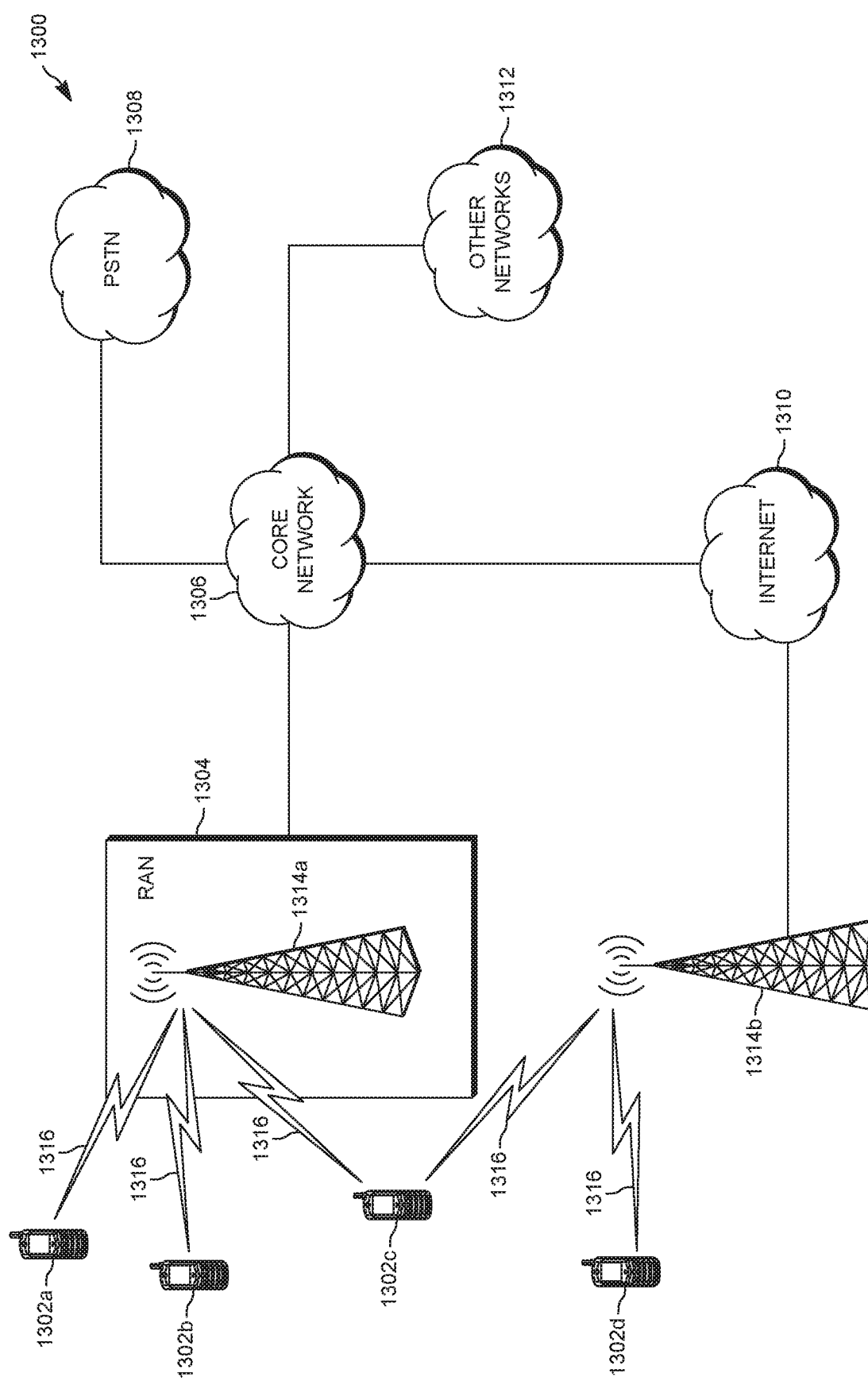
FIG. 13A is a system diagram illustrating an example communications system in which one or more disclosed embodiments may be implemented.

FIG. 13A is a diagram illustrating an example communications system 1300 in which one or more disclosed embodiments may be implemented. The communications system 1300 may be a multiple access system that provides content, such as voice, data, video, messaging, broadcast, etc., to multiple wireless users. The communications system 1300 may enable multiple wireless users to access such content through the sharing of system resources, including wireless bandwidth. For example, the communications systems 1300 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 13A, the communications system 1300 may include wireless transmit/receive units (WTRUs) 1302a, 1302b, 1302c, 1302d, a RAN 1304/1313, a CN 1306/1315, a public switched telephone network (PSTN) 1308, the Internet 1310, and other networks 1312, though it will be appreciated that the disclosed embodiments contemplate any number of WTRUs, base stations, networks, and/or network elements. Each of the WTRUs 1302a, 1302b, 1302c, 1302d may be any type of device configured to operate and/or communicate in a wireless environment. By way of example, the WTRUs 1302a, 1302b, 1302c, 1302d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 1302a, 1302b, 1302c and 1302d may be interchangeably referred to as a UE.

The communications systems 1300 may also include a base station 1314a and/or a base station 1314b. Each of the base stations 1314a, 1314b may be any type of device configured to wirelessly interface with at least one of the WTRUs 1302a, 1302b, 1302c, 1302d to facilitate access to one or more communication networks, such as the CN 1306/1315, the Internet 1310, and/or the other networks 1312. By way of example, the base stations 1314a, 1314b may be a base transceiver station (BTS), a Node-B, an eNode B, a Home Node B, a Home eNode B, a gNB, a NR NodeB, a site controller, an access point (AP), a wireless router, and the like. While the base stations 1314a, 1314b are each depicted as a single element, it will be appreciated that the base stations 1314a, 1314b may include any number of interconnected base stations and/or network elements.

The base station 1314a may be part of the RAN 1304/1313, which may also include other base stations and/or network elements (not shown), such as a base station controller (BSC), a radio network controller (RNC), relay nodes, etc. The base station 1314a and/or the base station 1314b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 1314a may be divided into three sectors. Thus, in one embodiment, the base station 1314a may include three transceivers, i.e., one for each sector of the cell. In an embodiment, the base station 1314a may employ multiple-input multiple output (MIMO) technology and may utilize multiple transceivers for each sector of the cell. For example, beamforming may be used to transmit and/or receive signals in desired spatial directions.

The base stations 1314a, 1314b may communicate with one or more of the WTRUs 1302a, 1302b, 1302c, 1302d over an air interface 1316, which may be any suitable wireless communication link (e.g., radio frequency (RF), microwave, centimeter wave, micrometer wave, infrared (IR), ultraviolet (UV), visible light, etc.). The air interface 1316 may be established using any suitable radio access technology (RAT).

More specifically, as noted above, the communications system 1300 may be a multiple access system and may employ one or more channel access schemes, such as CDMA, TDMA, FDMA, OFDMA, SC-FDMA, and the like. For example, the base station 1314a in the RAN 1304/1313 and the WTRUs 1302a, 1302b, 1302c may implement a radio technology such as Universal Mobile Telecommunications System (UMTS) Terrestrial Radio Access (UTRA), which may establish the air interface 1315/1316/1317 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 1314a and the WTRUs 1302a, 1302b, 1302c may implement a radio technology such as Evolved UMTS Terrestrial Radio Access (E-UTRA), which may establish the air interface 1316 using Long Term Evolution (LTE) and/or LTE-Advanced (LTE-A) and/or LTE-Advanced Pro (LTE-A Pro).

In an embodiment, the base station 1314a and the WTRUs 1302a, 1302b, 1302c may implement a radio technology such as NR Radio Access, which may establish the air interface 1316 using New Radio (NR).

In an embodiment, the base station 1314a and the WTRUs 1302a, 1302b, 1302c may implement multiple radio access technologies. For example, the base station 1314a and the WTRUs 1302a, 1302b, 1302c may implement LTE radio access and NR radio access together, for instance using dual connectivity (DC) principles. Thus, the air interface utilized by WTRUs 1302a, 1302b, 1302c may be characterized by multiple types of radio access technologies and/or transmissions sent to/from multiple types of base stations (e.g., a eNB and a gNB).

In other embodiments, the base station 1314a and the WTRUs 1302a, 1302b, 1302c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 1314b in FIG. 13A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 1314b and the WTRUs 1302c, 1302d may implement a radio technology such as IEEE 802.11 to establish a wireless local area network (WLAN). In an embodiment, the base station 1314b and the WTRUs 1302c, 1302d may implement a radio technology such as IEEE 802.15 to establish a wireless personal area network (WPAN). In yet another embodiment, the base station 1314b and the WTRUs 1302c, 1302d may utilize a cellular-based RAT (e.g., WCDMA, CDMA2000, GSM, LTE, LTE-A, LTE-A Pro, NR etc.) to establish a picocell or femtocell. As shown in FIG. 13A, the base station 1314b may have a direct connection to the Internet 1310. Thus, the base station 1314b may not be required to access the Internet 1310 via the CN 1306/1315.

The RAN 1304/1313 may be in communication with the CN 1306/1315, which may be any type of network configured to provide voice, data, applications, and/or voice over internet protocol (VoIP) services to one or more of the WTRUs 1302a, 1302b, 1302c, 1302d. The data may have varying quality of service (QoS) requirements, such as differing throughput requirements, latency requirements, error tolerance requirements, reliability requirements, data throughput requirements, mobility requirements, and the like. The CN 1306/1315 may provide call control, billing services, mobile location-based services, pre-paid calling, Internet connectivity, video distribution, etc., and/or perform high-level security functions, such as user authentication. Although not shown in FIG. 13A, it will be appreciated that the RAN 1304/1313 and/or the CN 1306/1315 may be in direct or indirect communication with other RANs that employ the same RAT as the RAN 1304/1313 or a different RAT. For example, in addition to being connected to the RAN 1304/1313, which may be utilizing a NR radio technology, the CN 1306/1315 may also be in communication with another RAN (not shown) employing a GSM, UMTS, CDMA 2000, WiMAX, E-UTRA, or WiFi radio technology.

The CN 1306/1315 may also serve as a gateway for the WTRUs 1302a, 1302b, 1302c, 1302d to access the PSTN 1308, the Internet 1310, and/or the other networks 1312. The PSTN 1308 may include circuit-switched telephone networks that provide plain old telephone service (POTS). The Internet 1310 may include a global system of interconnected computer networks and devices that use common communication protocols, such as the transmission control protocol (TCP), user datagram protocol (UDP) and/or the internet protocol (IP) in the TCP/IP internet protocol suite. The networks 1312 may include wired and/or wireless communications networks owned and/or operated by other service providers. For example, the networks 1312 may include another CN connected to one or more RANs, which may employ the same RAT as the RAN 1304/1313 or a different RAT.

Some or all of the WTRUs 1302a, 1302b, 1302c, 1302d in the communications system 1300 may include multi-mode capabilities (e.g., the WTRUs 1302a, 1302b, 1302c, 1302d may include multiple transceivers for communicating with different wireless networks over different wireless links). For example, the WTRU 1302c shown in FIG. 13A may be configured to communicate with the base station 1314a, which may employ a cellular-based radio technology, and with the base station 1314b, which may employ an IEEE 802 radio technology.

Figure 13B:
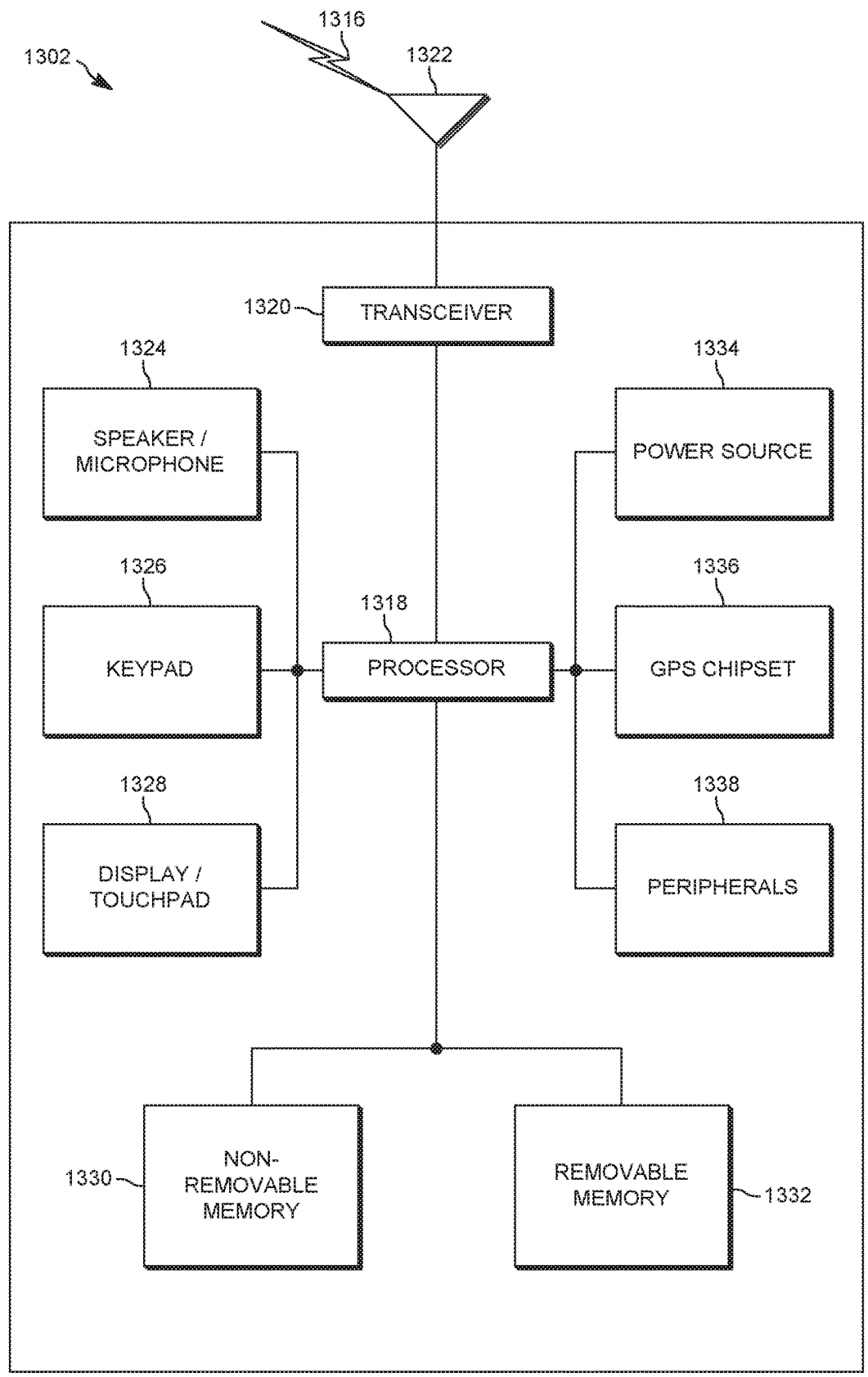
FIG. 13B is a system diagram illustrating an example wireless transmit/receive unit (WTRU) that may be used within the communications system illustrated in FIG. 13A according to an embodiment.

FIG. 13B is a system diagram illustrating an example WTRU 1302. As shown in FIG. 13B, the WTRU 1302 may include a processor 1318, a transceiver 1320, a transmit/receive element 1322, a speaker/microphone 1324, a keypad 1326, a display/touchpad 1328, non-removable memory 1330, removable memory 1332, a power source 1334, a global positioning system (GPS) chipset 1336, and/or other peripherals 1338, among others. It will be appreciated that the WTRU 1302 may include any sub-combination of the foregoing elements while remaining consistent with an embodiment.

The processor 1318 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 1318 may perform signal coding, data processing, power control, input/output processing, and/or any other functionality that enables the WTRU 1302 to operate in a wireless environment. The processor 1318 may be coupled to the transceiver 1320, which may be coupled to the transmit/receive element 1322. While FIG. 13B depicts the processor 1318 and the transceiver 1320 as separate components, it will be appreciated that the processor 1318 and the transceiver 1320 may be integrated together in an electronic package or chip.

The transmit/receive element 1322 may be configured to transmit signals to, or receive signals from, a base station (e.g., the base station 1314a) over the air interface 1316. For example, in one embodiment, the transmit/receive element 1322 may be an antenna configured to transmit and/or receive RF signals. In an embodiment, the transmit/receive element 1322 may be an emitter/detector configured to transmit and/or receive IR, UV, or visible light signals, for example. In yet another embodiment, the transmit/receive element 1322 may be configured to transmit and/or receive both RF and light signals. It will be appreciated that the transmit/receive element 1322 may be configured to transmit and/or receive any combination of wireless signals.

Although the transmit/receive element 1322 is depicted in FIG. 13B as a single element, the WTRU 1302 may include any number of transmit/receive elements 1322. More specifically, the WTRU 1302 may employ MIMO technology. Thus, in one embodiment, the WTRU 1302 may include two or more transmit/receive elements 1322 (e.g., multiple antennas) for transmitting and receiving wireless signals over the air interface 1316.

The transceiver 1320 may be configured to modulate the signals that are to be transmitted by the transmit/receive element 1322 and to demodulate the signals that are received by the transmit/receive element 1322. As noted above, the WTRU 1302 may have multi-mode capabilities. Thus, the transceiver 1320 may include multiple transceivers for enabling the WTRU 1302 to communicate via multiple RATs, such as NR and IEEE 802.11, for example.

The processor 1318 of the WTRU 1302 may be coupled to, and may receive user input data from, the speaker/microphone 1324, the keypad 1326, and/or the display/touchpad 1328 (e.g., a liquid crystal display (LCD) display unit or organic light-emitting diode (OLED) display unit). The processor 1318 may also output user data to the speaker/microphone 1324, the keypad 1326, and/or the display/touchpad 1328. In addition, the processor 1318 may access information from, and store data in, any type of suitable memory, such as the non-removable memory 1330 and/or the removable memory 1332. The non-removable memory 1330 may include random-access memory (RAM), read-only memory (ROM), a hard disk, or any other type of memory storage device. The removable memory 1332 may include a subscriber identity module (SIM) card, a memory stick, a secure digital (SD) memory card, and the like. In other embodiments, the processor 1318 may access information from, and store data in, memory that is not physically located on the WTRU 1302, such as on a server or a home computer (not shown).

The processor 1318 may receive power from the power source 1334, and may be configured to distribute and/or control the power to the other components in the WTRU 1302. The power source 1334 may be any suitable device for powering the WTRU 1302. For example, the power source 1334 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 1318 may also be coupled to the GPS chipset 1336, which may be configured to provide location information (e.g., longitude and latitude) regarding the current location of the WTRU 1302. In addition to, or in lieu of, the information from the GPS chipset 1336, the WTRU 1302 may receive location information over the air interface 1316 from a base station (e.g., base stations 1314a, 1314b) and/or determine its location based on the timing of the signals being received from two or more nearby base stations. It will be appreciated that the WTRU 1302 may acquire location information by way of any suitable location-determination method while remaining consistent with an embodiment.

The processor 1318 may further be coupled to other peripherals 1338, which may include one or more software and/or hardware modules that provide additional features, functionality and/or wired or wireless connectivity. For example, the peripherals 1338 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 1338 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 1302 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 1318). In an embodiment, the WRTU 1302 may include a half-duplex radio for which transmission and reception of some or all of the signals (e.g., associated with particular subframes for either the UL (e.g., for transmission) or the downlink (e.g., for reception)).

What is claimed:

1. A detect and avoid method for an unmanned aerial vehicle (UAV) comprising circuitry, the method comprising:

receiving, by the UAV, an environment configuration from a traffic management server, the environment configuration including at least a size of a tessellated grid of cells representative of a conflict zone, a resolution of the grid of cells and a suitable time horizon parameter representative of a required time for conflict detection;

transmitting, by the UAV, one or more of a position and a set of one or more grid cell identifiers representing waypoints;

receiving, by the UAV, for a given time period, a set of values associated with identified cells of the grid of cells, the set of values identifying a likelihood of conflict for one or more of the identified cells; and determining, by the UAV, an updated set of the one or more grid cell identifiers if the set of values identifying the likelihood of conflict is non-zero;

wherein the determining, by the UAV, the updated set of the one or more grid cell identifiers if the set of values identifying the likelihood of conflict is non-zero includes:

performing an optimization of the set of values by determining a minimization of $\Sigma_{i=1}^{n_r} a_{ij} x_{ij,t} - \Sigma_{i=1}^{n_r} (p_{ij})_{k,t} x_{ij,t}$, wherein $p_{ij}$ represents value data, $a_{ij}$ represents a known profit of UAV j in utilizing the grid cell i along its trajectory, $x_{ij,t}$ is a binary variable that represents the occupancy of grid cell i by the UAV j, and t represents a time.

2. The method of claim 1 further comprising:
iteratively determining, by the UAV, updated sets of the one or more grid cell identifiers until the received sets of values associated with identified cells stabilizes.

3. The method of claim 1 wherein the traffic management server is an unmanned aircraft system (UAS) traffic management (UTM) edge server (Edge-UTM server).

4. The method of claim 1 wherein the conflict zone is a region under the Edge-UTM server's jurisdiction, the conflict zone including one or more of obstacles and no-fly zones.

5. The method of claim 1 further comprising:
transmitting, by the UAV, a position, velocity and intent broadcasting signal (PIBS) message to the traffic management server.

6. A detect and avoid method for an unmanned aerial vehicle (UAV) comprising circuitry, the method comprising:
receiving, by an unmanned aircraft system (UAS) traffic management (UTM) server, one or more intended trajectories from one or more UAVs;
determining, by the UTM server one or more conflicts based on the intended trajectories intersecting over a region monitored by the UTM server;
communicating, by the UTM server the one or more conflicts, the communicating comprising: assigning a value to each of a plurality of three-dimensional (3D) grid cells representing the region monitored by the UTM server, each value representative of a potential for conflict associated with a grid cell; and transmitting, to the one or more UAVs, value data associated with the plurality of grid cells;
iteratively receiving by the UTM server one or more updates to the one or more intended trajectories from the UAVs, the one or more updates determined by optimizing the one or more intended trajectories by minimizing a summation representing locations, time and value representative of potential for conflict of each of the intended trajectories; and
iteratively communicating, by the UTM server to the one or more UAVs, updated value data associated with the plurality of grid cells;
wherein the updated value data is based on a determination including $(p_i)_{k,t} = (p_i)_{k-1,t} + \alpha(\Sigma_{j=1}^{n_a} x_{ij,t} - N_{i,t})$ wherein $x_{ij,t}$ is the binary variable that represents the occupancy of grid cell i by the UAV j, and t represents a time, and N represents a maximum number of UAVs permitted a cell in the plurality of grid cells $x_{ij}$ and $(p_{ij})_k$ represents the value of the cell.

7. The method of claim 6, wherein the iteratively communicating updated value data includes communicating to the one or more UAVs grid cells with the potential for conflict.

8. The method of claim 6 wherein the plurality of 3D grid cells is a tessellated area including at least a conflict zone determined based on a safe operating distance between the one or more UAVs.

9. The method of claim 6 wherein each UAV operates as a client with the UTM server, each UAV separately determining an updated trajectory using the value data received by the UTM server.

10. The method of claim 6 wherein the UTM server is an edge-UTM server operating over a mobile edge computing (MEC) environment.

11. The method of claim 6 wherein a time period over which a grid cell of the plurality of 3D grid cells has a value that does not change identifies a stabilization of the grid cell.

12. A detect and avoid apparatus for an unmanned aerial vehicle (UAV) comprising circuitry, the apparatus comprising a processor configured to perform at least:
receiving, by the UAV, an environment configuration from a traffic management server, the environment configuration including at least a size of a tessellated grid of cells representative of a conflict zone, a resolution of the grid of cells and a suitable time horizon parameter representative of a required time for conflict detection;
transmitting, by the UAV, one or more of a position and a set of one or more grid cell identifiers representing waypoints;
receiving, for a given time period, a set of values associated with identified cells of the grid of cells, the set of values identifying a likelihood of conflict for one or more of the identified cells;
determining an updated set of the one or more grid cell identifiers if the set of values identifying the likelihood of conflict is non-zero;
wherein the determining the updated set of the one or more grid cell identifiers if the set of values identifying the likelihood of conflict is non-zero includes:
performing an optimization of the set of values by determining a minimization of $\Sigma_{i=1}^{n_r} a_{ij} x_{ij,t} - \Sigma_{i=1}^{n_r} (p_{ij})_{k,t} x_{ij,t}$, wherein $p_{ij}$ represents value data, $a_{ij}$ represents a known profit of UAV j in utilizing the grid cell i along its trajectory, $x_{ij,t}$ is a binary variable that represents the occupancy of grid cell i by the UAV j, and t represents a time.

13. The apparatus of claim 12, wherein the processor is further configured to perform:
iteratively determining updated sets of the one or more grid cell identifiers until the received sets of values associated with identified cells stabilizes.

14. The apparatus of claim 12 wherein the traffic management server is an unmanned aircraft system (UAS) traffic management (UTM) edge server (Edge-UTM server).

15. The apparatus of claim 12 wherein the conflict zone is a region under the Edge-UTM server's jurisdiction, the conflict zone including one or more of obstacles and no-fly zones.

16. The apparatus of claim 12, wherein the processor is further configured to perform:
transmitting a position, velocity and intent broadcasting signal (PIBS) message to the traffic management server.

* * * * *